US012189123B2

(12) United States Patent
Wieczorek

(10) Patent No.: US 12,189,123 B2
(45) Date of Patent: Jan. 7, 2025

(54) SYSTEM AND METHOD FOR HAPTIC INTERACTIVE EXPERIENCES

(71) Applicant: Mark D. Wieczorek, San Diego, CA (US)

(72) Inventor: Mark D. Wieczorek, San Diego, CA (US)

(*) Notice: Subject to any disclaimer, the term of this patent is extended or adjusted under 35 U.S.C. 154(b) by 299 days.

(21) Appl. No.: 17/671,891

(22) Filed: Feb. 15, 2022

(65) Prior Publication Data
US 2022/0252881 A1    Aug. 11, 2022

Related U.S. Application Data

(63) Continuation-in-part of application No. 17/507,945, filed on Oct. 22, 2021, now Pat. No. 11,733,515, which is a continuation of application No. 17/389,798, filed on Jul. 30, 2021, now Pat. No. 11,609,426, which is a continuation of application No. 17/148,095, filed on Jan. 13, 2021, now Pat. No. 11,137,601, application No. 17/671,891 is a continuation-in-part of application No. 17/391,514, filed on Aug. 2, 2021, now Pat. No. 11,899,208, which is a continuation of application No. 17/344,250, filed on Jun. 10, 2021, now Pat. No. 11,287,654, which is a continuation of application No. 17/215,375, filed on Mar. 29, 2021, now Pat. No. 11,106,035, which is a continuation-in-part of application No. 17/094,460, filed on Nov. 10, 2020, now Pat. No. 10,965,784, which is a continuation of application No. 17/094,428, filed on Nov. 10, 2020, now Pat. No. 10,921,591, which is a continuation of application No. 17/086,909, filed on Nov. 2, 2020, now Pat. No. 10,921,590, which is a continuation of application No. 16/945,765, filed on Jul. 31, 2020, now Pat. No. 10,921,589, which is a continuation of application No. 15/931,958, filed on May 14, 2020, now Pat. No. 10,761,325, which is a continuation of application No. 16/785,970, filed on Feb. 10, 2020, (Continued)

(51) Int. Cl.
*G02B 27/01* (2006.01)
*A63F 13/00* (2014.01)

(52) U.S. Cl.
CPC ............ *G02B 27/017* (2013.01); *A63F 13/00* (2013.01); *G02B 2027/0138* (2013.01)

(58) Field of Classification Search
None
See application file for complete search history.

(56) References Cited

U.S. PATENT DOCUMENTS

| 5,872,438 A | 2/1999 | Roston |
| 6,695,770 B1 | 2/2004 | Choy |

(Continued)

OTHER PUBLICATIONS

Leithinger, Daniel, et al. "Shape displays: Spatial interaction with dynamic physical form." 2015; IEEE computer graphics and applications 35.5; pp. 5-11. (Year: 2015).*

(Continued)

*Primary Examiner* — Peter Hoang

(57) ABSTRACT

Systems and methods according to present principles allow haptic forces and effects to be effectively combined and employed in virtual worlds and interactions, in order to allow the enjoyment of the same in various circumstances.

17 Claims, 19 Drawing Sheets

Related U.S. Application Data now Pat. No. 10,690,913, which is a continuation of application No. 16/382,448, filed on Apr. 12, 2019, now Pat. No. 10,558,042, which is a continuation of application No. 14/669,744, filed on Mar. 26, 2015, now Pat. No. 10,725,298.

(60) Provisional application No. 63/149,776, filed on Feb. 16, 2021, provisional application No. 63/167,763, filed on Mar. 30, 2021, provisional application No. 63/186,308, filed on May 10, 2021, provisional application No. 63/135,927, filed on Jan. 11, 2021, provisional application No. 63/134,130, filed on Jan. 5, 2021, provisional application No. 61/970,512, filed on Mar. 26, 2014.

(56) References Cited

U.S. PATENT DOCUMENTS

| | | |
|---|---|---|
| 2005/0116954 A1 | 6/2005 | Ripps |
| 2006/0015560 A1 | 1/2006 | MacAuley |
| 2006/0262120 A1 | 11/2006 | Rosenberg |
| 2007/0186007 A1 | 8/2007 | Field |
| 2008/0081701 A1 | 4/2008 | Shuster |
| 2008/0294663 A1 | 11/2008 | Heinley |
| 2009/0063156 A1 | 3/2009 | Squedin |
| 2011/0082009 A1 | 4/2011 | Ranky |
| 2012/0226987 A1 | 9/2012 | Wie |
| 2013/0271457 A1 | 10/2013 | Haswell |
| 2014/0009490 A1 | 1/2014 | Gardenfors |
| 2014/0046829 A1 | 2/2014 | Serban |
| 2014/0063061 A1 | 3/2014 | Reitan |
| 2014/0114845 A1 | 4/2014 | Rogers |
| 2014/0306866 A1 | 10/2014 | Miller |
| 2015/0002541 A1 | 1/2015 | Dillavou |
| 2015/0268722 A1* | 9/2015 | Wang .................... A63F 13/843 345/156 |
| 2016/0035140 A1 | 2/2016 | Bickerstaff |
| 2016/0093108 A1 | 3/2016 | Mao |
| 2016/0189494 A1* | 6/2016 | Levesque ................ G06F 3/016 340/407.1 |
| 2018/0330549 A1 | 11/2018 | Brenton |
| 2019/0249908 A1* | 8/2019 | Yi .......................... A63F 13/24 |
| 2021/0043011 A1* | 2/2021 | Gates ..................... G06F 3/013 |

OTHER PUBLICATIONS

García-Valle, Gonzalo, et al. "Evaluation of presence in virtual environments: haptic vest and user's haptic skills." 2017; IEEE Access 6; pp. 7224-7233. (Year: 2017).*

Loral; "Tip of the Week-Raiding in EverQuest—Jul. 3, 2007"; Jul. 3, 2007; all pages; https://www.everquest.com/news/imported-eq-enus-50487.

Information on Leap Motion, Inc., download Apr. 23, 2021 from Wikipedia at https://en.wikipedia.org/wiki/Leap_Motion (author unknown).

* cited by examiner

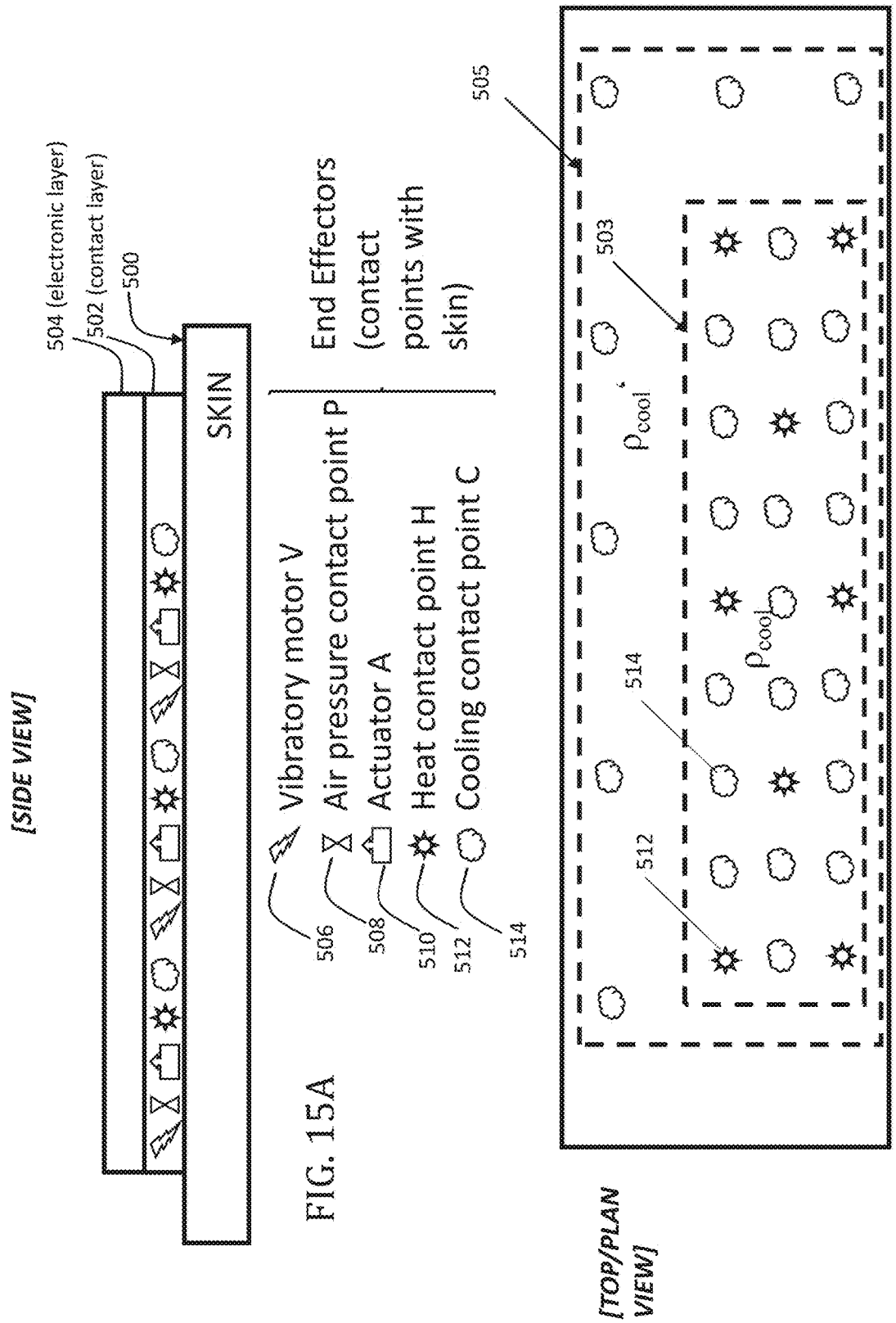

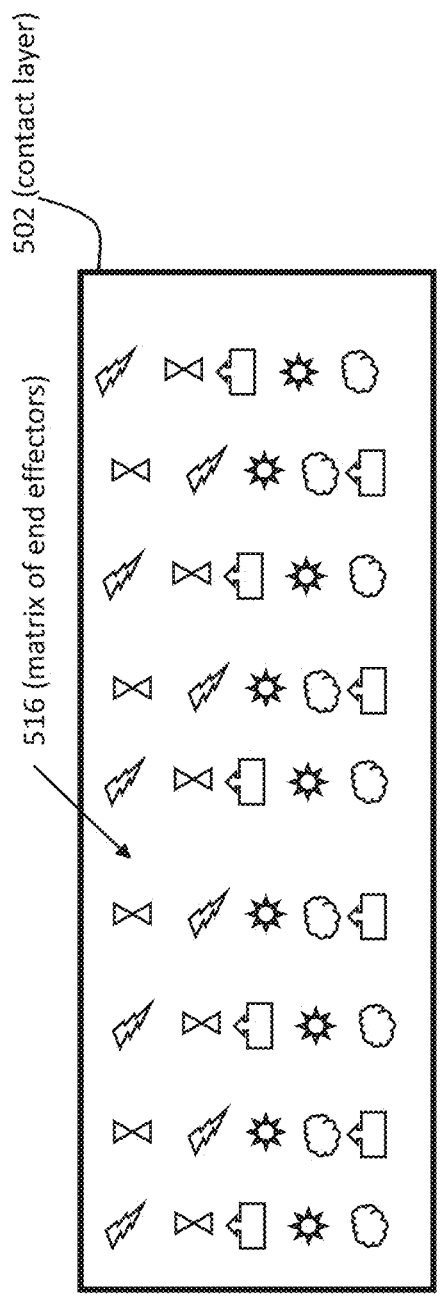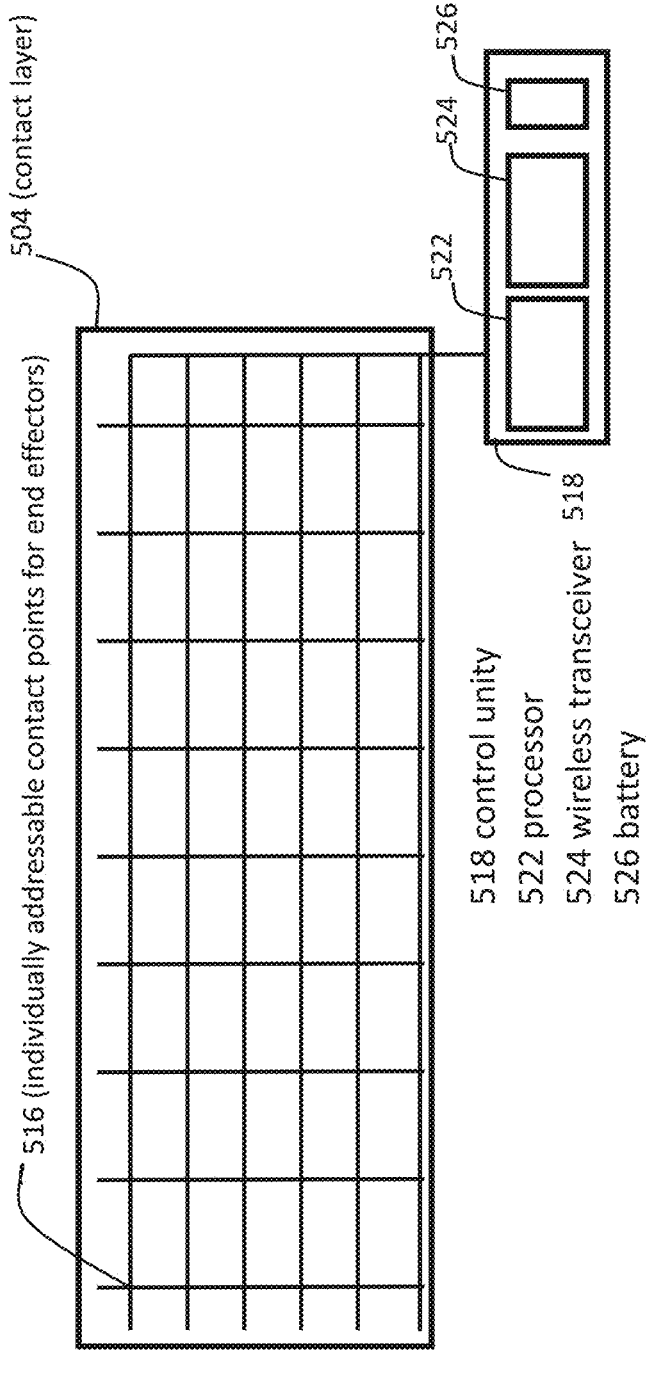
Fig. 16 [TOP VIEW]
Fig. 17 [TOP VIEW]

SYSTEM AND METHOD FOR HAPTIC INTERACTIVE EXPERIENCES

CROSS-REFERENCE TO RELATED APPLICATIONS

This application claims the benefit of U.S. Provisional Application Ser. No. 63/149,776, filed Feb. 16, 2021, U.S. Ser. No. 63/167,763, filed Mar. 30, 2021, and U.S. Ser. No. 63/186,308, filed May 10, 2021, the contents of which are incorporated herein by reference. This application also is a continuation-in-part of Ser. No. 17/507,945, filed Oct. 22, 2021, which is a continuation-in-part of U.S. Ser. No. 17/389,798, filed Jul. 30, 2021, which is a continuation of U.S. patent application Ser. No. 17/148,095 (now U.S. Pat. No. 11,137,601), filed Jan. 13, 2021, which claims the benefit of U.S. Provisional Patent Application Ser. No. 63/134,130, filed Jan. 5, 2021, and U.S. Provisional Patent Application Ser. No. 63/135,927, filed Jan. 11, 2021. This application is also a continuation-in-part patent application of U.S. patent application Ser. No. 17/391,514, filed Aug. 2, 2021, which is a continuation of U.S. Ser. No. 17/344,250, filed Jun. 10, 2021, which is a continuation of U.S. Ser. No. 17/215,375 (now U.S. Pat. No. 11,106,035), filed Mar. 29, 2021, which is a continuation of U.S. Ser. No. 17/094,460 (now U.S. Pat. No. 10,965,784), filed Nov. 10, 2020, entitled "VIRTUAL REALITY DEVICES AND ACCESSORIES", which is a continuation of U.S. patent application Ser. No. 17/094,428 (now U.S. Pat. No. 10,921,591), filed Nov. 10, 2020 (same title), which is a continuation of U.S. patent application Ser. No. 17/086,909 (now U.S. Pat. No. 10,921,590), filed Nov. 2, 2020 (same title), which is a continuation of U.S. patent application Ser. No. 16/945,765 (now U.S. Pat. No. 10,921,325), filed Jul. 31, 2020 (same title), which is a continuation of U.S. patent application Ser. No. 15/931,958, filed May 14, 2020 (same title), now U.S. Pat. No. 10,761,325, which is a continuation of U.S. patent application Ser. No. 16/785,970, filed Feb. 10, 2020 (same title), now U.S. Pat. No. 10,690,913, which is a continuation of U.S. patent application Ser. No. 16/382,448, filed Apr. 12, 2019 (same title), now U.S. Pat. No. 10,558,042, which is a continuation of U.S. patent application Ser. No. 14/669,744, filed Mar. 26, 2015 (same title), now U.S. Pat. No. 10,725,298, which claims priority from U.S. Provisional Patent Application Ser. No. 61/970,512, filed Mar. 26, 2014. The contents of each of which are incorporated herein by reference in their entireties.

FIELD

The invention relates to the field of haptics for use in virtual or augmented reality environments.

BACKGROUND

Virtual Reality (VR) headsets, such as the Oculus Rift®, Oculus Quest 1 and 2, HTC Vive, various Windows Mixed Reality headsets, as well as augmented reality headsets such as the Microsoft Hololens are poised to become a significant new factor in computer environments, including gaming, virtual tourism, and the like. Some believe the same will even constitute the next generation of computing platforms. The same may even be gaining popularity in times of pandemic, as other sources of entertainment, e.g., theme parks, have been closed. Of course, in times of pandemic, other sorts of computer entertainment become more popular as well.

In addition, themed attractions have been extraordinarily popular for many years. Such range from small individual carnival rides to huge theme parks such as Disneyland. Individual attractions may include both thrill rides as well as so-called "dark rides" that carry a user through the telling of a story. More generally, and citing Wikipedia, "A dark ride or ghost train is an indoor amusement ride on which passengers aboard guided vehicles travel through specially lit scenes that typically contain animation, sound, music and special effects.".

Another type of themed attraction is a haunted attraction, in which typically patrons walk through a "maze" and are treated to various thrills, including so-called "jump" or "startle" scares (delivered by "scare actors"), as well as scenes of varying levels of gore. Other aspects of such haunted attractions may include animatronics, light and sound effects, and the like.

The themed attraction industry was seriously hurt in 2020 due to the novel coronavirus pandemic, which closed theme parks and restaurants, shut down businesses of all kinds, and generally prevented attraction customers from getting together in any sort of high population density, as are common for themed attractions including haunted attractions, popular culture conventions, theme parks, or the like.

This lack of ability to enjoy such pursuits has led to discontent on many levels.

In some cases, such as thrill rides, where riders can be spaced apart and need not necessarily come into close contact with operators, the enjoyment of the ride may still be potentially possible, if the ride is otherwise allowed to operate and appropriate social distancing is observed. In other cases, however, such as in the area of haunted attractions, there is simply no substitute for use of a human actor. Human actors, as opposed to animal, can "think on their feet", adjusting their actions to the perceived desires of the guest, and simply provide better acting, e.g., more effective scares. Generally operators have difficulty employing animatronics to achieve similar levels of interaction, e.g., similar levels of scare.

But having multiple so-called "scare actors" in close proximity to each other and to multiple groups of guests, each with one to several persons, compounds the danger of viral transmission. In addition, some potential patrons are simply afraid to go to such haunted attractions because they are unable to control the experience or are afraid of appearing scared in front of their friends.

It is widely believed that the next phase in the process of achieving immersion will come from simulating the sense of touch, also known as haptic technology.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Certain implementations of systems and methods according to present principles meet the needs of the above in several ways. In addition, this application incorporates by reference the subject matter of U.S. patent application Ser. No. 14/669,744, now U.S. Pat. No. 10,725,298, owned by the assignee of the present application and herein incorporated by reference in its entirety.

As an introduction, it is noted that the problem of viral transmission in the case of multiple scare actors entertaining multiple guests may be addressed in part according to present principles by the use of networked computer technology, especially where such can provide an immersive environment for an isolated patron, but where the socially distanced or isolated patron is grouped virtually in a common environment with other patrons, as well as with one or more actors, where all or some are represented by corresponding avatars in the common environment, such as is enabled by virtual reality (VR) or augmented reality (AR) glasses, goggles, headsets, or other such head-mounted displays (HMD). In some cases, the immersive environment can be embodied in this way: a user may operate a network computer and be provided with a view of a common environment using a display, e.g., a VR headset, AR headset, or a separate computer monitor. In some implementations, portable computers, such as may be provided by tablet computers, laptop computers, or smart phones, may also be employed, although typically the level of immersion is in some cases lowered as the screen size goes down. Accordingly, where the use of an AR or especially a VR headset or head-mounted display ("HMD") is employed, the level of immersion can be greatly increased.

A user experiencing this immersive environment (which can be a "common" environment in the case of multiple users viewing the same environment) may then be caused to traverse through a maze, which here is intended to be an inclusive term meaning a path or set of paths through which a user travels and during which the user may encounter various interactions with actors. In some cases the interactions are entirely computer-generated, both in terms of their appearance as well as the AI employee to control them. In other cases the interactions are displayed using computer-generated (CG) avatars and CG models, but the interactions are controlled by actual actors who are operating the CG avatars which are situated within the common environment and are viewing the common environment through the viewpoint of the avatar. Alternatively, actors may not themselves have a VR view of the common environment but may still be able to operate an avatar within the same. The actor actions, which may be translated into corresponding or associated or related or correlated avatar actions, and the operation may include head rotations, head translations, hand movements (where the hands are imaged by a head-mounted camera (or other camera) or where the hand movements are indicated by the locations and orientations of handheld controllers), body motions, and on up to full body movements using appropriate body tracking or other such motion capture technology. Various combinations and sub-combinations of these types of operations will also be understood to be implementable.

In some cases the actors and/or the maze is real or actual, e.g., a physical building, and a video of the interaction is transmitted to the user's immersive environment. In the case of a haunted attraction, the interactions may include seeing something scary, seeing something scary that is animated, encountering a jump scare or startle scare caused by an avatar controlled by a human scare actor. Regarding this latter implementation, the human scare actor may be controlling a monster avatar or other such avatar of a scary creature, in the case where the environment is computer-generated. In the case where a "customer" is experiencing a themed attraction by having an actual camera traverse an actual set, i.e., a haunted attraction maze, then the scare actor would be "real" as well, though in video, and would actually jump out at the real camera to elicit the desired entertainment, e.g., a scare.

A disadvantage of such multi-performer themed attractions is that each actor (variously termed "actor", "scare actor", "performer", and the like) spends a significant portion of time standing around, not doing anything, e.g., between arrivals of groups of guests (variously termed "user", "guest", "customer", "client", "patron", and the like). Systems and methods according to present principles allow a single actor, or a small group of actors, to take on multiple roles within a single attraction, and thus allow the same to operate significantly more efficiently. This affordance is enabled by the networked computer technology, which allows a single actor to jump from location to location within a maze. In this way, the actor need not come into close contact with patrons, nor need the actor come into close contact with other actors. This facility is controlled by the actor interface described below. As an additional benefit, a single actor may be enabled to adopt various and different personages at each different location, because all that need be changed is the avatar the actor controls. Moreover, in a particular embodiment, a scare actor can move from one location, often termed a "scare pocket" or more generally an "action pocket", to another location or scare pocket rapidly and can also change the character they are playing, i.e., portraying, by changing their avatar. It is noted that this benefit is a particular benefit of the case where a human scare actor is controlling a computer-generated image or avatar; however, the environment itself can be computer-generated or actual. If computer-generated, then such may be best viewed within a virtual reality HMD. This is also true if the environment is actual (variously termed "actual" or "real" or "real life") but not local to the customer. If the environment is actual and local to the customer, i.e., the customer's house, then the greatest immersion may be via an AR HMD that can directly view the locale (the house) through the AR glass display or a VR HMD that is equipped with a forward-facing camera and can either provide a video feed of what the customer is seeing or can generate a CG version of what the customer is seeing.

In one aspect, the invention is directed towards a method of operating a virtual experience, including: operating a server to communicate with a first user computing environment, the first user computing environment coupled to a first display, the first user computing environment configured to generate a first camera view corresponding to a location of a first camera within a maze, the first camera view viewing an environment displayed in the first display; and operating the server to communicate with an actor computing environment, the actor computing environment coupled to an actor display, the actor computing environment configured to generate an actor interface, the actor interface providing a link whereby an actor activating the link may access and control an actor avatar situated in an action pocket within the environment, where the actor interface further displays one or more entries, and where a display of a particular entry is in part instantiated based on when a user game object associated with the first user computing environment interacts with a respective particular trigger within the environment.

Implementations of the invention may include one or more of the following. The first display may be selected from the group consisting of a virtual reality display, an augmented reality display, a computer monitor, a tablet display, or a smart phone display. The environment may be a common environment, and the method may further include operating the server to communicate with a second user computing environment, the second user computing environment coupled to a second display, the second user computing environment configured to generate a second camera view corresponding to a location of a second camera within the maze, the second camera view viewing the common environment displayed in the second display.

A position and orientation of the second camera view may be the same as a position and orientation of the first camera view. The actor computing environment may include a virtual or augmented reality headset associated with the actor, the virtual or augmented reality headset may include a respective virtual or augmented reality display, the actor computing environment may further include one or more handheld controllers enabling actor interaction with the actor interface, the actor computing environment may further include an input for visualization and depiction of actor hands, where data for the input for visualization and depiction of actor hands is generated in part by the one or more handheld controllers or by a camera imaging the actor hands.

The camera may be external or may be situated on the virtual or augmented reality headset associated with the actor. The virtual or augmented reality headset associated with the actor and coupled to the actor computing environment may be configured to generate an actor view within the environment associated with the activated link. The actor view may be associated with the location and orientation of the actor avatar. The actor view may be associated with the action pocket. The method may further include capturing actions of the actor using the actor computing environment, and may further include operating the server to display a representation of the captured actions within the environment. The captured actions may include 3-dof head movements, 6-dof head movements, hand movements, and so on. The hand movements may be based on hand images captured by a camera or controller movements, where the controller movements may include both controller position and orientation. The hand images may also be captured by a camera and include hand position, and orientation, and optionally hand gesture. The captured actions may include one or more actor vocalizations, and the method may further include modulating the one or more actor vocalizations. The display of the one or more entries may include sorting the one or more entries according to a characteristic time associated with each entry. The characteristic time may be associated with a time duration between a time at which the user game object interacts with the respective particular trigger and a time at which the user game object is expected to reach a location associated with the action pocket within the environment.

The user game object may be associated with multiple game objects, each game object associated with a user. The multiple game objects may be each associated with a user avatar. The multiple game objects may be further each associated with a user virtual camera. The multiple game objects may be each associated with a user virtual camera. The multiple game objects may be associated with respective multiple user computing environments, the multiple game objects each under the control of a respective one of the multiple user computing environments. The multiple game objects may be each allowed to roam under the control of the respective one of the multiple user computing environments, but such that the multiple game objects are constrained against moving outside of a defined area. The defined area may be moved at a nonzero speed through the environment. The nonzero speed may be constant or is varied. One of the multiple game objects may be configured to automatically follow another of the multiple game objects through the maze, the automatically following caused by a user of the user computing environment associated with the one of the multiple game objects.

The environment may include computer-generated components. The environment may further include components based on video data. The environment may be generated using video data.

The video data may be data from a light field camera and the first display may be a VR display or an AR display. The environment may be a real environment and the first display may be an AR display. The method may further include receiving first locomotion data from the first user computing environment, and using the first locomotion data to translate or rotate the first camera view, or both.

The first locomotion data may be received from an accelerometer, a multidirectional treadmill, or a camera in signal communication with the first user computing environment. The first locomotion data may be received from a joystick in signal communication with the first user computing environment. The actor interface may also include one or more action buttons, the one or more action buttons linking to potential actions performed by the actor or actor avatar upon activation of the respective button. The potential action may be an audio action, and where upon activation of the respective button an audio source may be caused to activate within the environment. The potential action may be a visual action, and where upon activation of the respective button the actor avatar may be caused to perform a predefined visual action within the environment. The visual action may be a CG action or a video action.

The actor interface further includes an information section, the information section displaying information about users or user settings associated with one of the one or more entries. The method may further include operating the server to receive one or more user settings from the first user computing environment, and where the received one or more user settings are used to control at least in part an appearance of the actor avatar or of the environment. The method may further include operating the server to receive data about the maze from the first user computing environment, the data about the maze associated with a user desired locale. The received data may be video data or layout data. The method may further include processing the received data to determine locations of one or more action pockets. The processing may include determining using object recognition locations of one or more doors, windows, or cabinets. The method may further include procedurally generating the environment at least in part following the step of operating a server to communicate with a first user computing environment. The procedural generation of the environment may be configured to allow the maze to be traversed by a user in a period of time that is equal to, less than, or otherwise within a predefined duration of time.

The server may be a social networking server. The server may be a server of a social networking site, and the method may further include operating the server to allow the first user computing environment to stream the first camera view to viewers on the social networking site.

In other implementations, systems and methods according to present principles include a server incorporating a non-transitory computer readable medium having instructions stored thereon that cause the server to perform the methods described above, as well as subsets of the steps of these methods.

In yet other implementations, systems and methods according to present principles include one or more headsets incorporating a non-transitory computer readable medium having instructions stored thereon that cause the respective one or more headsets to perform the methods described above, as well as subsets of the steps of these methods. In some cases, the headsets work together to perform the methods as an aggregate system. In some cases the headsets include appropriate computing environments, and in other cases the headsets generally only provide a display and sensors, and the same are coupled to a user computing environment.

In yet other implementations, systems and methods according to present principles include one or more headsets in combination with one or more servers, each incorporating a non-transitory computer readable medium having instructions stored thereon that cause the respective one or more headsets in combination with the one or more servers to perform the methods described above, as well as subsets of the steps of these methods.

Advantages of the invention may include, in certain embodiments, one or more of the following. Enjoyable interactions may be enabled in a way safe from the dangers of viral transmissions. A single actor or a reduced number of actors may be enabled to provide interactions for users, customers, guests, or patrons, because the same may be enabled to quickly traverse from one action pocket to another, as well as to change the appearance of their avatar, due to the virtual nature of the maze and the virtual nature of the avatar appearance. Here it is noted that the virtual maze may be computer-generated (CG) or may be displayed using a video image of an actual physical maze. Enjoyable interactions may be obtainable using systems and methods according to present principles even for patrons who are afraid to go to physical themed attractions or who are unable to do so because of disability or the like. Actors may be enabled to provide interactions at multiple virtual locations in an efficient manner using a UI (also termed an "actor interface") which allows the actor to be notified of upcoming arrivals of patrons, and even to sort which interactions are upcoming in order of their likely occurrence, so as to allow the actor to prepare for the virtual interaction. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 15A is a side cross-sectional view of a portion of a haptic suit. FIG. 15B is a top plan view of a portion of a haptic suit, showing different densities of end effectors of a single type as well as different densities as between different types of end effectors.

FIG. 16 is a top view of a matrix of end effectors that may be employed in a haptic suit.

FIG. 17 is a top view of a circuit diagram indicating individually addressable contact points for end effectors, as well as a control unit and associated submodules.

Like reference numerals refer to like elements throughout. Elements are not to scale unless otherwise noted.

DETAILED DESCRIPTION

VR headsets, while providing high degrees of immersion, can also be very disorienting to a user. Accordingly, it can be helpful to users to have player character (PC) avatars move at a slow rate through the online environment. If a game or online environment is designed for VR, then the PC speed within the environment can be designed to be slow or below a predetermined threshold, e.g., less than 5 mph or 10 mph as measured within the online environment. If the game environment or game application is being retrofitted for VR, then the PC speed can be slowed down to the levels described.

Another disorienting aspect is that one typically games or performs virtual tourism while sitting down, while the PC is walking around within the online environment. This can be disorienting too, if for no other reason than the height differential between standing and sitting.

Figure 1:
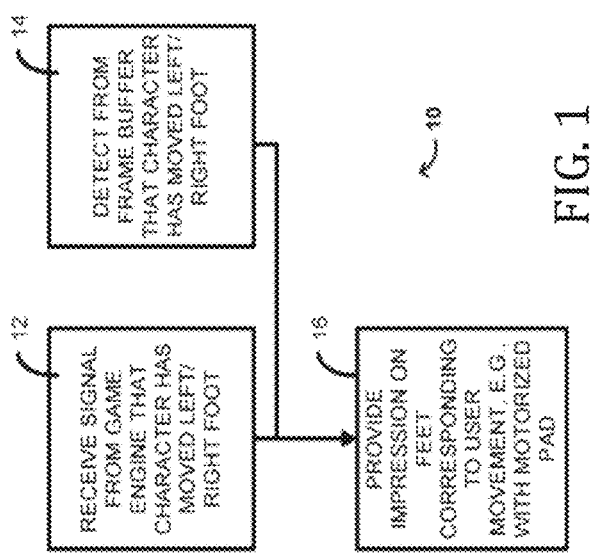
FIG. 1 is a flowchart of a method according to present principles.
Figure 2:
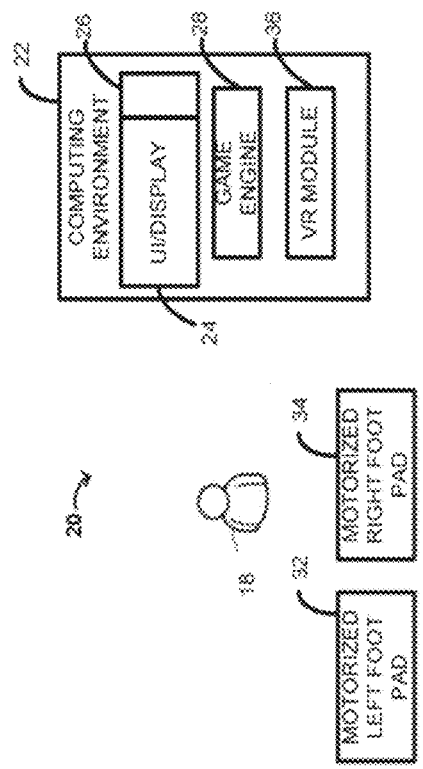
FIG. 2 is a schematic illustration of a system according to present principles.

Various solutions are available. In one implementation, and referring to the flowchart 10 of FIG. 1 and the schematic diagram of the system 20 of FIG. 2, motorized pads 32 and 34 may be placed on the feet of a user 18 and interfaced with the game engine 28 running on a computing environment 22. Alternatively, a frame buffer 26 may read the display 24 and estimate when character appendages (responsible for movement) are striking a surface. The estimation may be performed by a VR module 36 running on the computing environment, or alternatively the VR module may run within a VR headset. When the user walks through the environment, the motorized pads sequentially push up on the pads of the feet of the wearer. The interfacing may be, but is not limited to be, such that when the PC's left foot makes a step in the online environment, the left motorized pad is activated. When the PC's right foot makes a step, the right motorized pad is activated. Speed changes may be recognized, as can force with which a foot strikes the surface, e.g., whether the user is walking delicately or running hard. Standing in place can be simulated by relatively constant pressure on each foot (leaning may also be accommodated). The motorized pads may be conveniently disposed on a surface on which a user rest their feet, or within footwear.

In one method, a signal may be received from the game engine that a character is moving (step 12), and in some cases the signal may even indicate whether a left foot or right foot is currently moving. In some cases the movement, and/or a particular appendage moving, may be detected using a frame buffer analyzing the display (step 14). A VR module, or other input/output module within the game, may then provide an impression on the feet of the user corresponding to the movement of the player character within the game or other virtual environment (step 16). Such an impression may be performed using, e.g., a motorized pad.

It is noted that the accuracy of the motorized pads need not be perfect. So long as the user generally feels forces against their feet, the immersion may be maintained.

Figure 3:
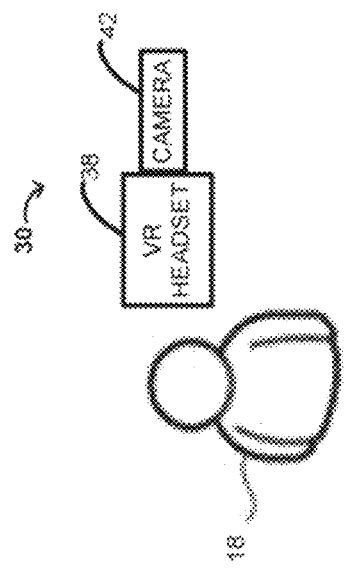
FIG. 3 is another schematic illustration of a system according to present principles.

Another disorienting factor comes from the lack of vision outside of the VR headset, and in particular the aspect that if a user moves their hands up in front of their face, they do not see their hands. While several hand and body sensors exist and can be used to detect when hands should be rendered, such as generally complicated and too expensive for most users. Accordingly, in a system 30 illustrated in FIG. 3, a simple low resolution camera 42, mounted on the VR headset 38, may be employed to detect the approximate position of the user's hands and feed the same into the game engine to allow for the rendering of "approximate" versions of the user's hands.

Various benefits inure to such systems. First, the system may scale to higher resolutions as cameras become higher resolution, cheaper, and lighter (weight is an important factor for inclusion onto a headset). Camera position on a headset is convenient for visualization as there is unity in that what the camera sees is the same as what the user would expect to view from their eye position within the headset.

Figure 4:
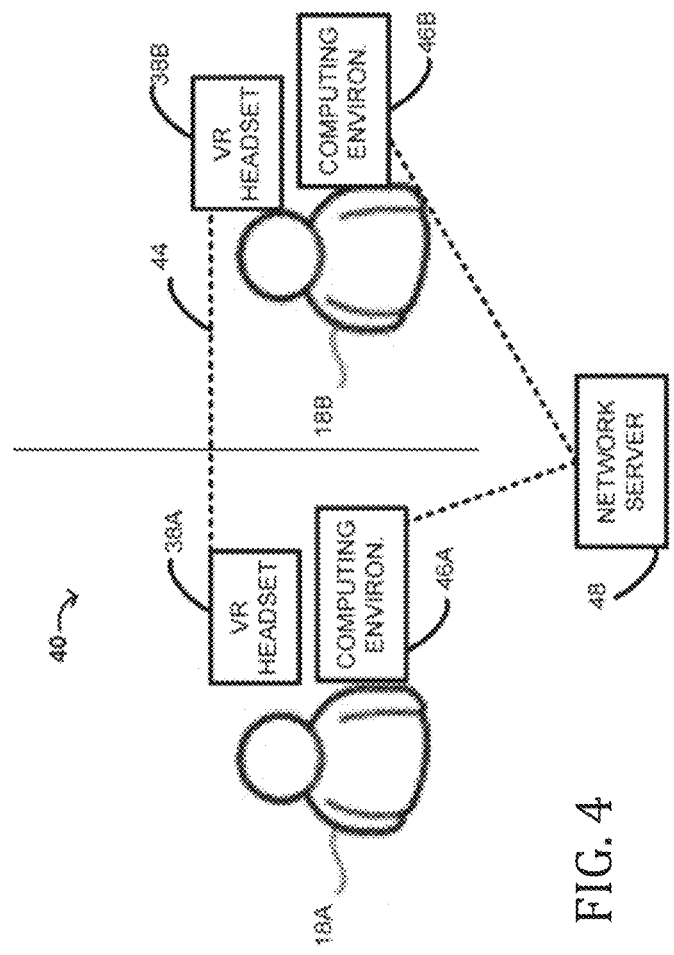
FIG. 4 is another schematic illustration of a system according to present principles.

Another important application concerns multiplayer uses. In particular, and referring in particular to the system 40 depicted in FIG. 4, two users 18A and 18B may each have a respective VR headset 38A and 38B and may be in data communication with each other via a communications link 44, e.g., over the Internet, Bluetooth, LAN, WLAN, cellular communications, NFC, or any other sort of communications technology existing now or developed later. The client application on each person's system, e.g., computing environments 46A and 46B, respectively, which control operations on VR headsets 38A and 38B, may be a thin client or a substantial one. It is noted here that the headsets 38A and 38B may also be embodied by augmented reality (AR) headsets as well. In addition, the headsets may well incorporate all the computing functionality needed to perform the applications described here; this may be particularly true as processor power continues to increase along with miniaturization. The systems and methods according to present principles may work well with both types of systems.

Alternatively, the client systems may communicate via a web application or a hybrid system where one user employs a standalone client and another a web application. The web application or standalone client may form a portion of a network such as a social network where communications occur over one or more network servers 48. For example, a Facebook® application may employ VR headsets and users may be thereby enabled to communicate with each other. In this system, where previously members would communicate with each other via Facebook video or voice chatting, a VR communication application may advantageously take advantage of the virtual reality SDK, e.g., Oculus Rift® SDK, to perform similar functionality.

However, in systems and methods according to current principles, users may go far beyond just seeing each other. For example, each user may have associated therewith an avatar, and various levels of avatar customization can be allowed. In some cases, a selection of hair lengths, hair colors, facial shapes, skin colors, body types, heights, eye colors, and the like, may be employed to allow customization of an avatar. In more advanced implementations, users may be permitted to submit photographs of their head or their entire body to allow a three-dimensional reconstruction of the same to be created and employed in the simulation.

In a particular implementation of a VR simulation within a social network, a "page tour" functionality is enabled where users can give tours of their social networking page to a friend or other reviewer. Users may even record (within the application) a video of such tours, so that others may be enabled to view the recorded tour at their convenience. In a page tour, a first user leads a second user on a tour of the events chronicled on the first user's social networking page. For example, the users may appear to walk down a timeline, with various pictures at respective various locations in time. The first user may point out aspects of the photos or videos to the second user, and one or both users may "teleport" to other pages by following links on the first user's social networking page. For example, if in the past the first user "checked in" at the Eiffel Tower in France, and the first user was giving a tour including that check in to a second user, the first user (or the second user) may click on a link to view a third-party three-dimensional reconstruction of the Eiffel Tower, so as to allow the first user to give a tour of the Eiffel Tower to the second.

In the same way, the first user may "teleport" to a relative's page to point out various family members or the like.

Other variations will also be understood. For example, the background of the virtual reality seen may not be just "black" or static. For example, if the first user is giving a tour of friends to a second user, French scenes may provide a backdrop, and French music may be played as an audio file.

Figure 5:
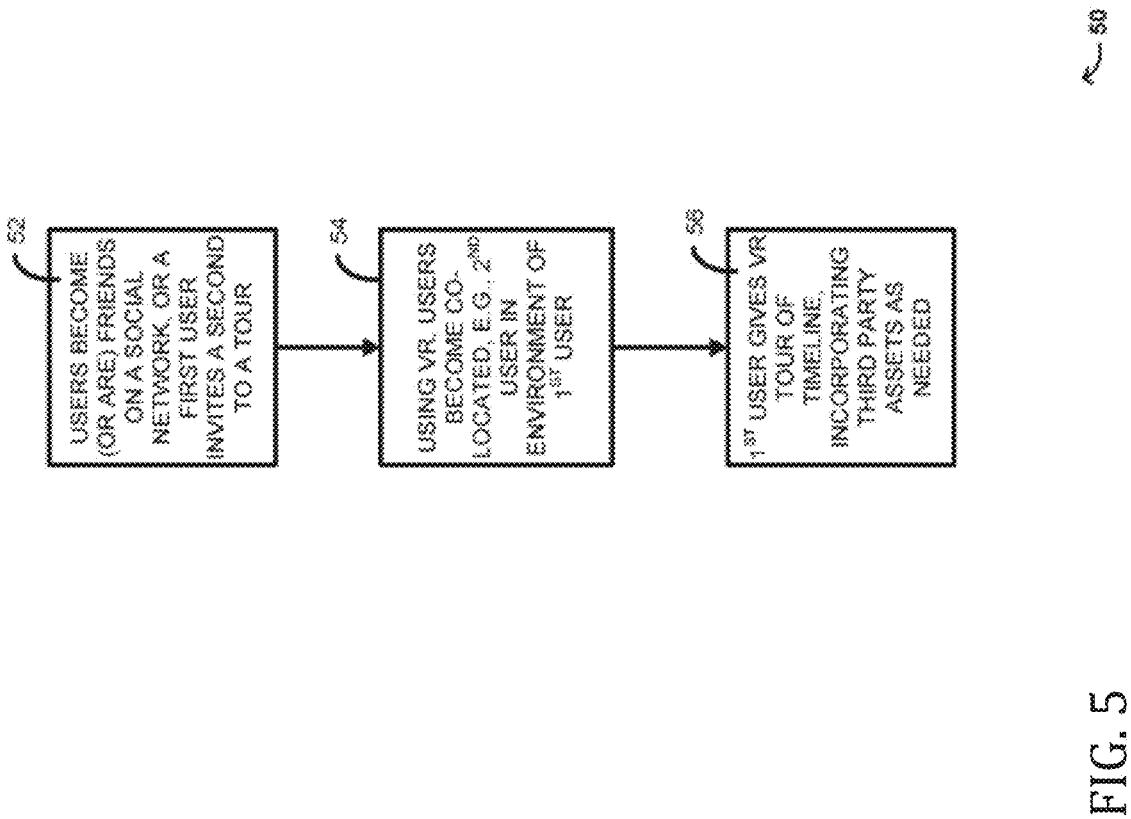
FIG. 5 is another flowchart of a method according to present principles.

In a general implementation, as shown in the flowchart 50 of FIG. 5, a first step is that users become (or already are) friends on a social network, or are otherwise associated within a network, such that a second user is allowed to view aspects and personal information of the first user (step 52). Alternatively, a first user may invite the second user to a tour.

Using virtual reality or augmented reality, the users become co-located (step 54), such that each can see the other, e.g., via the avatars described above, or in other ways. The first user then commences to give a virtual reality tour of the assets available to them, e.g., on a Facebook timeline (step 56). As noted, third-party assets may be incorporated if desired, e.g., to give a virtual tour of the Eiffel tower.

The tour may be in real-time, with both users using virtual reality headsets at the same time, or the first user may record their tour for playback in virtual reality to one or more other users at a later time. For example, such may afford the opportunity for a first user to record a life tour for playback to relatives, friends, and loved ones, e.g., as part of a genealogical history or autobiography. The same may be used in hospice situations to record a life history. The same may also form part of an ongoing VR journal.

Figure 6:
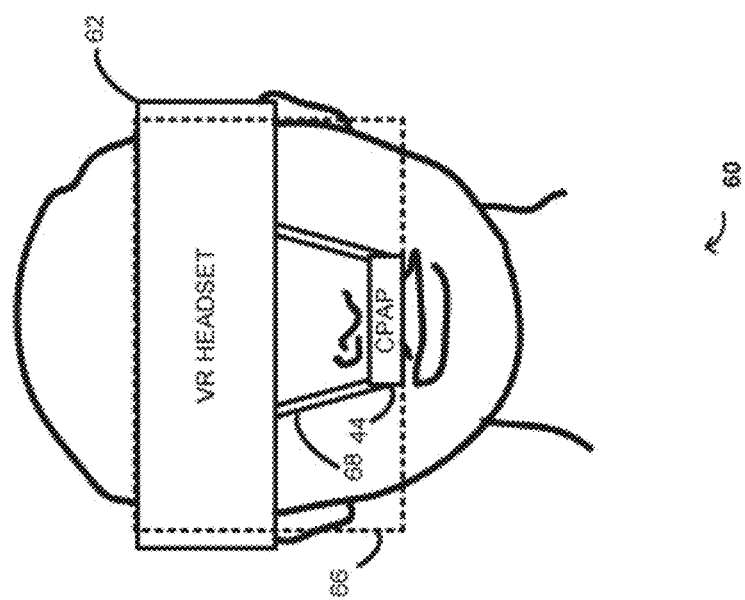
FIG. 6 is another schematic illustration of a system according to present principles.

Other variations will also be understood. For example, and referring to the system 60 of FIG. 6, the immersive headsets described above may advantageously be combined with CPAP machines. In particular, CPAP machines are known to have a low degree of patient compliance because of their uncomfortable character. However, if the VR headset is made large enough, e.g., to envelop the user's nose, as illustrated in the implementation 66, an oxygen supply can be directed through nozzles into the user's nose, performing a positive pressure process, and accomplishing the goals of prior CPAP machines. Alternatively, nozzles 44 may be coupled to the headset 62 but located exterior thereof, e.g., below the headset via pressure hoses 68, so as to allow engagement or positioning adjacent the nasal canal of a user. In use, the same method is performed, with the nozzles directing a positive flow of air or oxygen into the nose of the patient, allowing positive pressure, and accomplishing the goal of prior CPAP machines.

Other variations will also be understood. For example, while VR devices have been disclosed, systems and methods according to present principles may also be implemented within the context of AR devices or other computer monitors or displays.

In addition, it is noted that systems and methods according to present principles can generally not be performed without an appropriate computing environment configured to perform the steps disclosed here. In addition, by performing the steps as described, the computing environment is able to operate in a more efficient manner than virtual reality or augmented reality systems of the prior art.

Figure 7A:
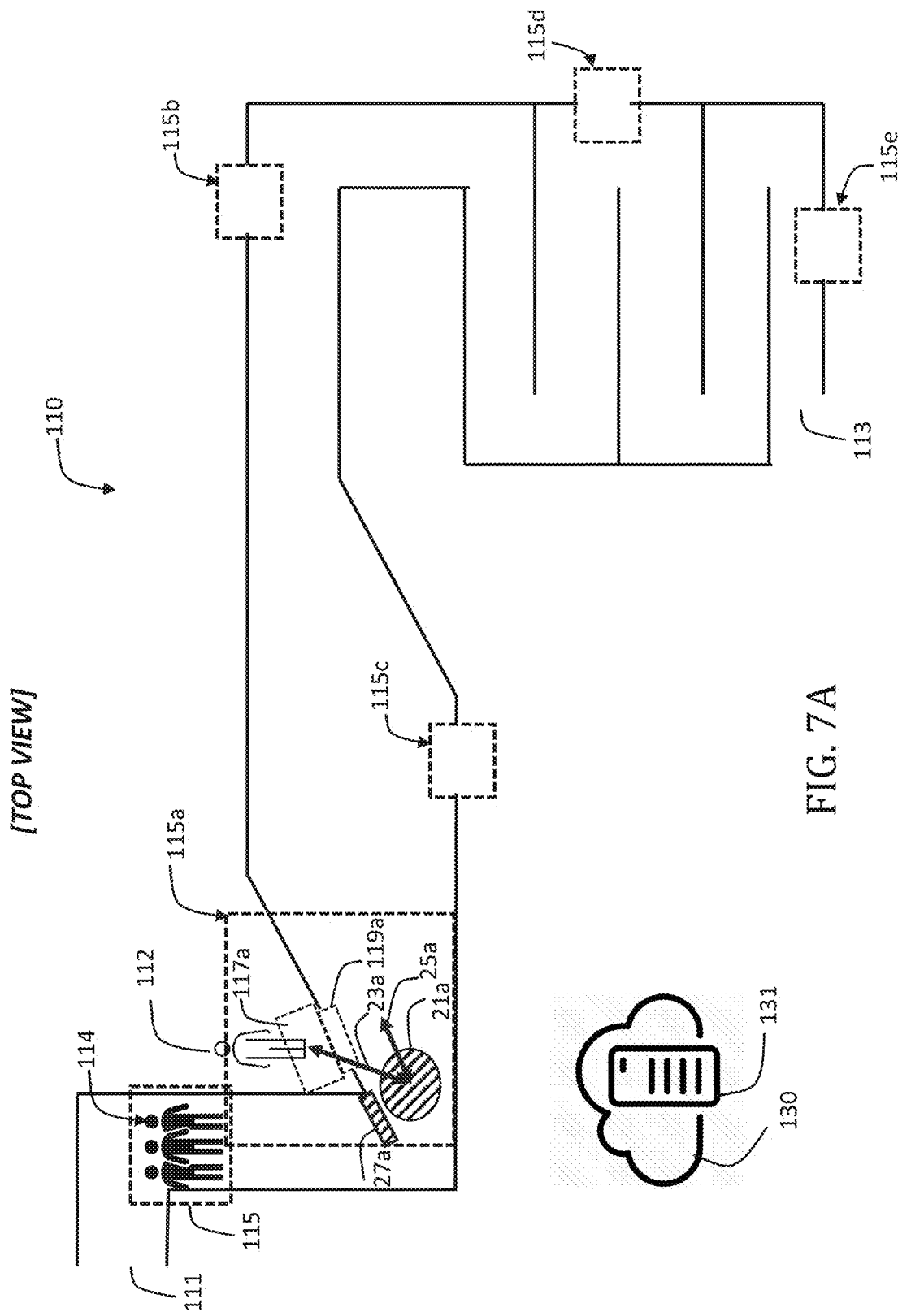
FIGS. 7A and 7B shows a top view of an exemplary maze experience according to present principles.

In alternative embodiments, a particular variation of a common environment may be a themed attraction such as a haunted attraction, e.g., a maze. For example, FIG. 7A illustrates an exemplary maze 110 having an entrance 111 and an exit 113. Various action pockets are shown, such as action pockets 115a-115e. In the case of a haunted attraction, these action pockets are termed "scare pockets". They are generally areas in which an actor controlling an avatar 112 may be situated (e.g., in hiding) until such time as they jump out and interact with a group of patrons or guests represented by avatars 114. In the case of a haunted attraction, the actor-controlled avatar may be caused to may jump out of the scare pocket and startle the patron or patrons, which may or may not have associated avatars. In the top view of FIG. 7A, the patrons 114 would travel down towards the trigger area 21a and would generally encounter (touch or collide with) the trigger 21a when they made a left turn (from their vantage point).

To accomplish the triggering, the avatars of the patrons 114 would either have individual colliders attached or a single collider would attach to their group. In some cases, the patrons may not have avatars, but would still have a virtual camera associated (see camera 216 of FIG. 10), either with each patron or with the group. In this case, the camera may have an associated collider, and the same may be employed to interact with the trigger area. Here it is noted that while the term "trigger area" is used, the same refers to the area pictured in the top down view in the maze, and that actually the trigger area may in many cases have associated therewith a trigger volume. The trigger area 21a (or equivalently, volume) would similarly have a collider attached, and by testing when the collider associated with the patrons 114 (or patron avatars) intersected with the collider associated with the trigger area 21a, the trigger would be activated. In some cases the patrons 114 (or their avatars) would have a mesh collider that maps to the general shape of their avatar, or the same could be more simply associated with a box collider that closely matched the size of the group. Alternatively, the avatars may each have associated therewith a cylindrical collider that roughly matched the "cylinder" shape of the avatar body. These collider types may be similar for that of the trigger area 21a. In many cases a cylindrical collider (out of the plane of the page of FIG. 7A) may be employed. In another implementation a box collider that is roughly the shape of a rectangular solid may be employed, and such as indicated by box collider 27a which may be situated as is or also "around the corner" and perpendicular to the current orientation of box collider 27a. Other orientations and shapes will also be understood.

The trigger area may, in some cases, be an actual area, or have a planar shape, in the case where the CG maze and avatars are generated as computer models termed "rigid bodies" and can thus be controlled to act under a computer-generated influence of gravity; then the avatar appearing to step on the trigger area may act to instantiate an entry on the actor interface.

Returning to the discussion of FIG. 7A, once the patrons have reached the trigger area, and once the actor has activated the appropriate link as described below in connection with the actor interface, the avatar 112 may be instantiated and appear at an action pocket or otherwise within the maze or other instantiation point. In one implementation, the location of the avatar 112 may be within the action pocket 117a, ready to move through the access hole 119a into the maze to perform the interaction. It will be understood that in some cases there need be no rigid body or collider on that part of the wall of the maze, and thus the avatar 112 may simply move directly through the wall. However, for purposes of immersion, it may be preferable for the avatar to actually appear to emerge through a doorway or hole, so as to heighten the immersion of the user.

There is generally associated some characteristic length or distance between the trigger area 21a and the actor 112. Two of these are shown in FIG. 7A. Distance 23a shows the distance between the center of the trigger area 21a (or volume) and the center of the action pocket 117a (or equivalently, volume). Distance 25a shows the distance between the center of the trigger area 21a and a perpendicular distance to the center of the action pocket 117a if the actor 112 were to emerge through the access hole 119a. Distance 25a may be more useful such that the actor 112 may be more likely to be aware of when the patrons 114 are passing the area of the action pocket. But it will be understood that either could be used and that various other characteristic distances may be employed according to the needs of the interaction or the desire of the actor or operator.

Figure 7B:
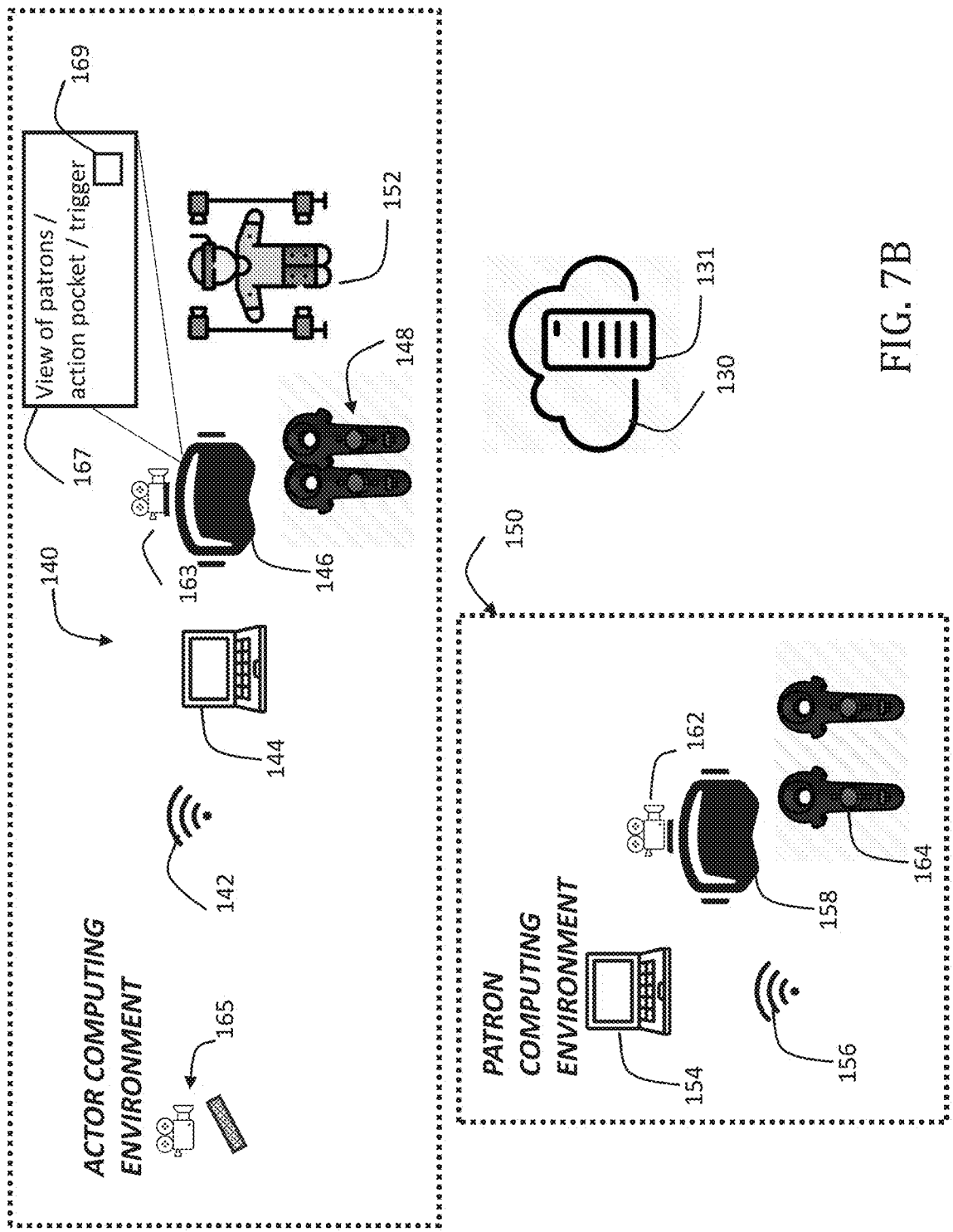

As may be seen in FIG. 7B, the actor that controls avatar 112 generally uses an actor computing environment 140. The actor computing environment 140 includes a computer 144 which may be coupled to the cloud 130 through a Wi-Fi connection 142. In some cases the actor can increase their own immersion in their acting by use of an HMD 146, which may further include controllers 148. As shown by the inset, a heads-up display or HUD 167 (or just regular VR display) of the HMD 146 may provide a view of the patron(s) from the action pocket, as well as potentially the trigger area, or whatever view may be set either the operator or actor to best serve the purposes of providing, preparing for, and delivering the interaction. The display 167 may include a button 169 to allow the actor to return to the actor interface. This button 169 may be termed a "Back to UI" button. Typically, the actor employs the actor interface to enter an area or action pocket near where an interaction with patrons will occur; then to return to the UI, the actor may activate the button 169.

The controllers 148 may be employed for various purposes as described, including operation of the actor interface as well as for detecting a location of the actor's hands, and thus allowing visualization of the same, as well as adjoining parts, e.g., arms, upper body, and so on. A camera 163 may also be employed for this purpose. In certain cases, for the best fidelity for reproduction of the actor's entire body movements, a motion capture system 152 may be employed. A camera and green screen system 165 may further be employed to allow video capture of actor actions, and however the actor action data is obtained, the same may then be entered into the computer 144 (if necessary) and up to the cloud 130 such that the server 131 may be operated to perform the desired functionality described herein.

Similarly, the user, customer, guest, or patron may employ a patron computing environment 150. It too is connected to the cloud 130, which includes a server 131, but in this case through a Wi-Fi connection 156.

The patron computing environment 150 may include a computer 154, coupled to a display which may be a typical laptop or desktop display or a HMD 158. As noted above, the HMD may be all-in-one and thus include the computing system integrated within the headset, or the same may simply provide a display and sensors that are run by a separate computing environment (the same is true for the HMD, if employed, of the actor). For visualization of the user's environment, hands, and so on, a camera 162 may be employed, which may be external or mounted to the HMD. The patron may further employ controllers 164 to allow entry of data including input settings, locomotion, and in some cases even virtual interactions with the actor. For example, in the case of a haunted attraction having scare actors, the controllers 164 may allow the user to "fight back" against the scare actor avatar 112.

How the system implemented for the maze of FIG. 7A may be employed according to present principles is now described. In more detail, implementations and arrangements according to present principles include systems and methods wherein a user (or customer or client or patron) is enabled to enter and to follow a path through a maze (this term is intended to include any sort of system of paths (or just a single path) to enjoy interactions at one or more locations within the maze), and then to exit the maze (either through a virtual exit or by their virtual camera view or avatar or both fading out and transporting away from the maze experience). These interactions may be along a path, in which case the system operator determines the order of interaction, or they may be along multiple paths or even no paths at all, in which case the user determines the order of interaction.

It is noted that if the maze has no path, then the location of the trigger area with regard to a particular action pocket may be more nuanced. Several trigger areas may be employed that "feed" into a particular pocket, or the trigger area may be closer to the action pocket than in the case where there is a path, in order to more unambiguously determine the presence of a patron. In such circumstances it may be more important for the actor to use a view provided, such as a video feed, to view upcoming guests, in order to determine the right time to emerge from the action pocket or to otherwise start the interaction with the patron or set of patrons. Alternatively, multiple trigger areas may be employed to determine a trajectory of the user, to ensure that the user is traversing in a direction appropriate for the interaction. In other words, multiple trigger areas, if monitored appropriately, may determine that the user is traveling in a particular direction. If this is a desired direction and appropriate for the action pocket, then the user may be instantiated as an entry on the actor interface. If the determined direction is not appropriate for the action pocket, the system may determine that the interaction is inappropriate, and the user or set of users may not be caused to be instantiated as an entry on the actor interface, and thus no interaction will occur.

Varieties of embodiments exist, and a nonlimiting list is tabulated in Table I below. Here certain varieties are listed which are currently believed to be of certain interest:

1. A user (with or without being "embodied" by an avatar (the user may simply be represented by a camera having a view of the maze)) (or a group of users) traverses through a CG maze (which may be predefined or which may be procedurally-generated) and real or actual actors (also embodied by avatars) interact with the user(s) in predefined or procedurally-generated "action pockets".
2. A user (or group of users) receives a video feed of an actual camera that is traversing a real or actual maze, and real or actual actors interact with the camera (and thus with the user (viewer) of the camera).
3. A user (or group of users) receives a video feed of an actual camera that is traversing a real or actual maze, and CG characters (controlled by actual actors) act in locations associated with action pockets and the CG character actions are overlaid on the video feed.
4. A user (with or without being "embodied" by an avatar as noted above) (or group of users) traverses through a CG maze (which may be predefined or which may be procedurally-generated) where the CG maze is based on a locale known or local to the user. For example, the maze may be based on a layout of the user's home, school, workplace, recreation center, and so on. Action pockets, termed "locale action pockets", may be identified or determined. In the case of a haunted attraction, these locale action pockets may be identified or determined as locations through doors or windows or other such locations in which the avatar of an actor can be hidden or obscured. Real or actual actors, embodied by avatars, may then virtually interact with the user in these locale action pockets. In the case of a haunted attraction, an actor may jump out from a locale action pocket to scare the user(s), and the impetus for the time of the "jumping out" may be an indication on an actor user interface as described below.

5. In an alternative embodiment to #4, the user may actually be traversing through the locale, and the locale may be imaged either directly (through an AR HMD) or through a camera (through a VR HMD). In this alternative embodiment, in the case of the VR HMD, the locale may be a direct video feed of the camera view or may be virtual, e.g., a CG re-creation of the locale. As above, action pockets, termed "locale action pockets", may be identified or determined. In the case of a haunted attraction, these locale action pockets may be identified or determined as locations through doors or windows that are visible by the user camera, just beyond the sight of the user (in this way an avatar of an actor can be hidden or obscured from view). Real or actual actors, embodied by avatars, may then virtually interact with the user in these locale action pockets. In the case of a haunted attraction, the actor may cause his or her associated avatar to appear to jump out from a locale action pocket to scare the user. The appearance of the avatar would be either superimposed on the actual view of the locale in the case of AR HMD or would be superimposed on the video or CG view of the locale in the case of a VR HMD.

A common motif in some of these varieties is that: (1) customers are separated from performers, (2) customers can be (if desired) separated from each other (e.g. if they are not from the same family or 'pod' as that termed has been developed to mean those who live with or close to each other and thus do not face particular additional viral transmission risk by contact), and (3) performers can be separated from performers. Performers may be separated from performers because the actual number of performers needed to populate the themed attraction or maze experience may be lessened because each performer can occupy multiple action pockets. Of course, to provide a personal interaction, each performer (or more correctly, each performer's avatar or video image) can only provide one interaction at a time, e.g., can only perform one interaction associated with a particular action pocket at a time. However, assuming that multiple action pockets need not be populated at any one given time, the performer can simply traverse practically instantaneously between action pockets using an appropriate actor interface, as is described below, and thus provide interactions were ever the same are needed. In some implementations, processing may be employed to change the gate of an actor (embodied by their avatar) so as to obscure the fact that one actor is performing multiple roles. This processing may be employed to change the gate, speed, or angles of movement, or other visual characteristics. Such may be particularly important as gate is a clear indicator of identity, even if users are unaware of their use of the same in this context.

The ability to traverse instantaneously is provided by the actor being "virtual", either using a CG avatar or using a video of the actor. Of course, in situations where a video of the actor is employed, the portions of the actor that are provided in the video can generally not be quickly changed. In other words, if the entirety of an actor's body is provided in a video image, that actor generally cannot change costumes as quickly as an actor using a CG avatar can change avatars. But, in some implementations, the body of the actor may provide an anchor and different (separate) avatars may be superposed atop the anchor body so as to allow the actor to appear to have different costumes on (as well as different heads and/or faces), thereby portraying different characters or avatars. In the case of a haunted attraction, the face, hands, and general body shape may be maintained, but the clothing may be changed from one type of character to another, e.g., a vampire to an undertaker. Various filters may be applied to allow the appearance of the face to change as well, e.g., from a pale vampire to a hairy werewolf or a decomposing zombie. Of course in other cases the entire CG rig and/or underlying character avatar body may be changed for each different action pocket, or according to the needs of the interaction or maze experience.

Timing of Actor Interaction

As noted above, a characteristic distance may be associated from a trigger area (or volume) to the location of an actor. This characteristic distance may in turn be associated with the time from which a patron or group of patrons activates a trigger to the time at which an actor is to perform an interaction with the patron or group of patrons. In the case of a haunted attraction, several users may pass a trigger area, and the trigger may be employed to notify the scare actor that the group of patrons is soon to pass the scare pocket, and thus the scare actor should prepare himself or herself to jump out from the scare pocket to provide the interaction, e.g., the scare. The characteristic distance may be associated with a characteristic time for this preparation, with an analogy of the well-known formula characteristic time=characteristic distance/characteristic speed or velocity. Here the characteristic speed or velocity can be, e.g., the speed of the fastest moving patron, the speed of the slowest moving patron, an average speed of all the patrons, a speed of a defined area 115 that the patrons are traveling on, via a "rail", or various other speeds.

For example, if the scare actor 112 desires to scare the first patron to arrive adjacent the scare pocket 117*a*, the actor may use (using a setting provided either by the operator of the attraction or on the actor interface described below) the speed of the fastest patron. If the actor wanted to scare the last patron to arrive, the actor may use the speed of the slowest patron (again using a setting as described above). If the actor wanted to scare the patrons in the middle of the group, he or she may use a mean or average speed. Of course it will be understood by one of ordinary skill in the art that the term "patron" above is intended to mean the avatar of the patron within the virtual common environment. In some cases patrons will not have an avatar, but will simply have a view of the common environment via a camera, e.g., a patron camera, which can either be provided for each individual patron or one mutual camera can be provided for all patrons. In either case, an indication may be provided, e.g., via the video feed on the actor interface, of the location of the camera, e.g., relative to the action pocket, such that the actor knows where to direct the action of the actor avatar. Put another way, and in the case of a haunted attraction, the scare actor needs to know where the patrons are so that he or she knows where to direct the scare.

Other examples will also be understood given this teaching. For example, a particular actor may be employed to interact with multiple customers in a group by performing an interaction once (e.g., in the case of a haunted attraction, a jump scare) but having the interaction be duplicated and displaced (using the CG system and performing a translation and displacement (and in some cases rotation) of the displayed action) so that the interaction appears to be facing each patron (avatar or camera) rather than only one. In this way, each customer gets a benefit of the interaction directly to themselves rather than just seeing the avatar of the actor address the group as a whole. In some cases this may require processing to change the speed, if any, with which the actor avatar approaches the group, so that the avatar approaches, is incident, or impinges on each patron avatar at the same time. Of course, not every interaction benefits from this. However, in the case of a scare interaction of a haunted attraction, it may be highly beneficial and enjoyable to have the scare directed at each customer, as that increases the scare level and thus the enjoyment. Of course, to allow the same to not become predictable, a random number generator may be employed to determine which patron avatar the scare is directed at. Combinations of the above and other features are also possible and will be understood.

It will be understood that the position of the avatar of the scare actor may be translated not only within the plane of the maze to address a particular patron but further may be translated out of the plane (up or down) of the maze such that the actor's avatar can appear to be taller or shorter than each user's avatar (or if the patron is not employing an avatar, the height of the camera causing the view for the patron). In the case of a haunted attraction, it is common to desire the monster to appear higher or towering over the patron's eye level to increase the amount of fear induced.

In addition, it is noted that there may be limitations on the extent to which actor avatar location may be displaced or translated (or rotated) so as to appear to each patron individually. In particular, there may be props which are part of the interaction that cannot similarly be moved without appearing unphysical to the user, thereby breaking the immersion. For example, an actor avatar may be a crazed doctor behind a operating table. The operating table may be a fixed location prop; accordingly, a restraint may be placed on the translation or displacement of the actor avatar, such that the same remains behind the operating table (though some movement per patron may still be accomplished).

GUI (or Actor Interface) for Customer Interaction

As noted above, it is an advantage of systems and methods according to present principles that a single actor may be employed to provide multiple actor/patron interactions, even at far-flung virtual distances between points in a virtual maze. But this functionality requires that the actor know when to appear at a particular action pocket.

Figure 8:
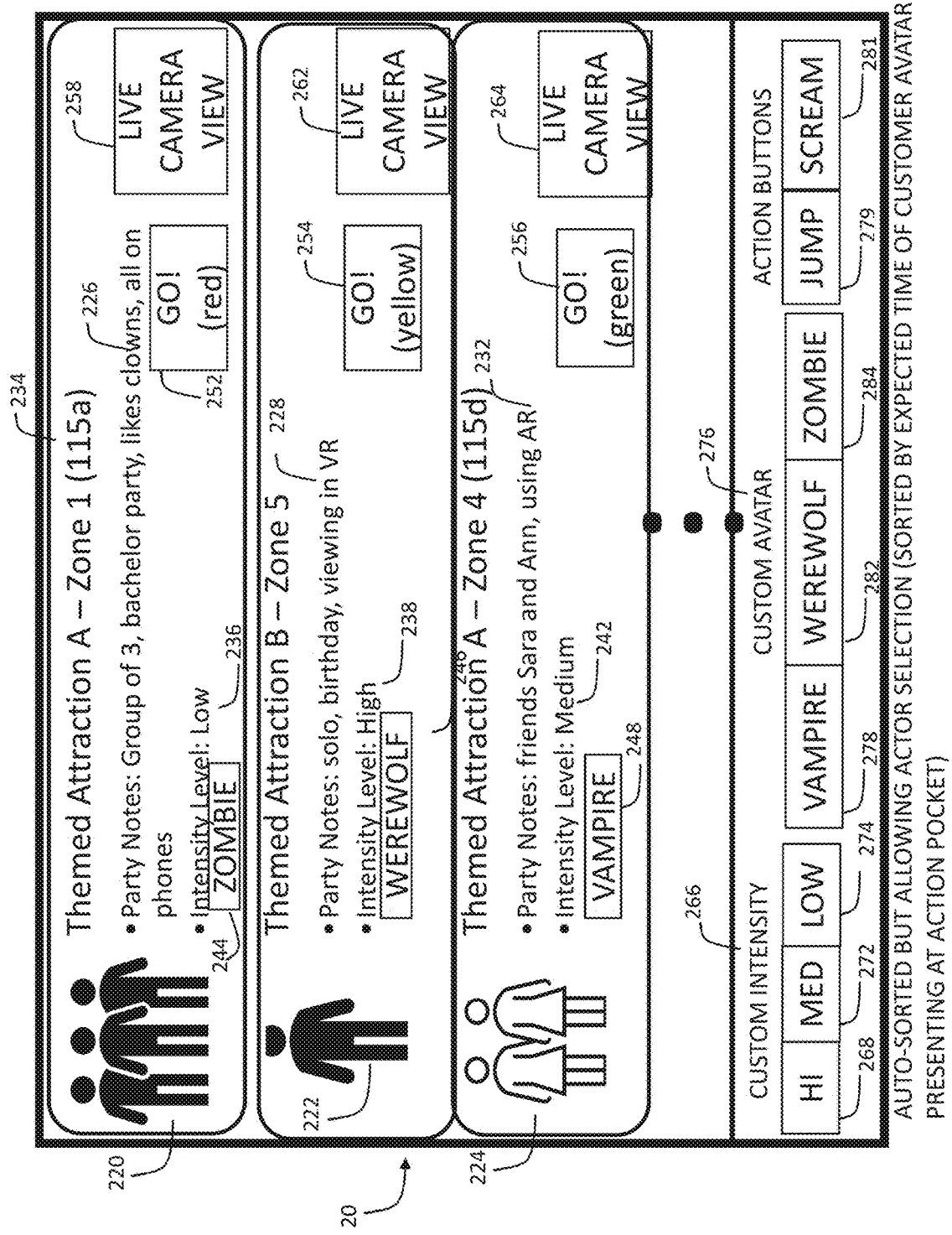
FIG. 8 shows an exemplary user interface according to present principles. Note that while the term "user interface" is employed for this element, it is generally an "actor" interface, as actors will generally use the same, and the term "user" as described above has been more generally used in connection with patrons, customers or guests.

FIG. 8 thus illustrates an exemplary user interface 20 which may be employed to notify the actor of when upcoming interactions should occur. FIG. 8 illustrates a vertically-sorted list of groups of patrons. In the actor interface 20, a group of three icons 220 represents one group of patrons having three members, a single icon 222 represents a single patron going through the maze individually, and the icon 224 represents two friends going through the maze together. In alternative implementations, the actor interface may have icons that do not indicate the number of patrons. That is, in some cases an icon of one person will be shown no matter whether it represents one patron or several. But in many cases multiple patrons will traverse a maze together, and in these situations multiple icons may be displayed, one for each patron, and the visualization may either be of the patron's avatar or of the patron him or herself if such an image is available.

Various character or avatar notes may be provided for each interaction, so that the actor can remind themselves of what sort of character they are playing (that is in turn visualized by the actor avatar). These are indicated by notes 244, 246, and 248. For example, if the actor is playing a werewolf 246, they may be reminded of this and thus inherently (or even explicitly, by another note) be reminded to growl instead of to speak (as noted below, voice modulation may also be employed to manually or automatically adjust the actor's voice).

An indication may be provided of which maze experience or themed attraction the patron is going through, and these are shown by indicator 234 and the like, e.g., Themed Attraction A, Zone 1 (e.g., corresponding to action or scare pocket 115a). A live camera view may be shown to show or indicate the patron or group of patrons as they approach the action pocket, and these are indicated by sections 258, 262, and 264. These camera views may be advantageously selected to provide a view from the action pocket to the trigger, so as to allow the actor to see the patrons as they approach the action pocket.

Other notes may also be provided, e.g., with sections 236, 238, and 242, as to a level of interaction. A low level of interaction in the case of a haunted attraction may mean that the user only wants to be frightened a little. A high level of interaction may mean that the actor should "pull out the stops" and act in such a way so as to provide or deliver as much scare as possible. As will be described below, this may include employment of haptic forces.

Party notes may be provided to give the actor an indication of additional details about the party, e.g., group of patrons, and such are indicated by party notes 226, 228, and 232. This may allow the actor to tailor a particular interaction according to details about the party, so as to increase the overall enjoyment of the patrons.

Each grouping of elements 220 (patron images or patron avatar images), 234, 226, 236, 244, 258, and 252 (described below) constitutes an "entry", and these entries may be automatically instantiated when each patron or group of patrons (more correctly, their avatars) reaches the trigger area. It will be understood that the trigger area may be preceded by a pre-trigger area, to give additional warning as to the soon-to-be impingement, incidence, or arrival of patrons (patron avatars) at the action pocket.

In FIG. 8 the entry corresponding to "Themed Attraction A—Zone 1" has been sorted to be at the top, and this may be where the actor looks first when determining where will be the next interaction to be delivered. This "next interaction" may be made more prominent by a different color, and enlargement of the overall entry on the actor interface, and so on.

The sorting of the entries may be on various bases, but a useful type of sort will be an automatic sort based on characteristic time as described above, sorted from low to high. In other words, the patrons that the actor will have to perform for first are located at the top of the list, and the rest of the list may be sorted by increasing characteristic times. Colors may also be employed such as the red, yellow, and green buttons shown, i.e., buttons 252, 254, and 256, as mentioned above. The buttons shown are provided with the word "GO!" because it is through selection/activation of these buttons that the actor may be caused to occupy and control an avatar within or associated with the action pocket, e.g., may be caused to occupy and control avatar 112 within scare pocket 117a (in the case of a haunted attraction). Once the actor activates the button and controls avatar 112, the actor may provide the interaction to the patrons, e.g., may jump out and scare the patrons in an area of the maze adjacent the action pocket (or within the same, or a combination), and then may back away back into the action pocket 117a. The avatar controlled by the actor may also be caused to just disappear, but as this is an unphysical sort of display (not occurring in a real-life haunted attraction), it tends to reduce immersion. But once the avatar of the actor is back into the scare pocket or otherwise no longer visible to the patron or patrons (which may also be accomplished by way of a fadeout), the actor may activate a button (either physical (e.g. on a controller) or in a UI viewable when they are embodying and controlling the avatar 112) and may then view the UI 20 again, e.g., to prepare for the next patron interaction, e.g., that within themed Attraction B as illustrated. As noted in the description with regard to FIG. 7B, the button 169 may be employed for this purpose. This button may also be activated even when the actor is not in the action pocket.

In an alternative implementation, rather than having the actor have to activate a button to get back to the user interface, only to have to push another button to move on to the next interaction, the actor may be caused to automatically go from one interaction to the next. To provide the most possible time for each interaction, the transition to the next interaction may be held off as long as possible, e.g., until such time as the next interaction is about to occur, or is about to occur within a predetermined timeframe, e.g., five seconds, 10 seconds, and so on.

To allow the actor to receive the necessary information for the next interaction, a UI within the actor system 140, e.g., which may be a desktop system or a VR/AR system, may provide a heads up display (HUD) with the necessary information, e.g., which attraction, what kind of patron, level of scare, and so on.

In many cases it is preferable that such occur by way of a HUD because the actor, in order to perform the necessary interactions, may likely be standing and away from a desktop or laptop display. Of course, a display may be mounted on the wall or at other convenient location to allow the actor to quickly see which interaction is coming up next. If on the wall, the actor may employ an AR HMD to allow themselves to see the wall display (or desktop monitor) as well as provide some visualization of the patron's avatars who are about to enter the area adjacent the action pocket, such that the actor knows the precise time in which to deliver the interaction, e.g., scare.

Besides the preprogrammed or intended avatars and intensities planned by the operator and programmed into the system, the actor may be employed via the actor interface 22 modify their avatar, the intensity, as well as to perform certain preprogrammed actions. To accomplish this, a custom intensity section 266 may be employed, where the actor can adjust the intensity using buttons 268, 272, and 274, so as to change the intensity to either high, medium, or low. As noted elsewhere, this may accomplish a change of avatar, volume, type of audio, whether haptics are included, and so on. A custom avatar section 276 may be employed to provide buttons 278, 282, and 284, showing labels which are simply exemplary, so as to allow the actor to take on a particular avatar look, even if the same is not intended according to a program of the maze. This custom avatar functionality may be employed to allow interactions to occur out of sequence if necessary to accommodate unexpected patron movements, or to just provide a level of unexpectedness to the maze encounter. Preprogrammed action buttons 279 and 281 may be employed to perform commonly performed actions, so that the actor need not actually physically perform them each time. As may be seen, these include a jump functionality, which is typically a visual action, as well as a scream functionality, which is an audio function. Particularly where actors are going from action pocket to action pocket continuously, having preprogrammed actions may help to save the actor's energy and voice, as the actor need only push a button rather than perform the action physically. In some cases the performance of these actions by the processor may be provided with a degree of randomness, e.g., the action speed or exact appearance may vary, so as to not appear to be operated on a program.

Devices employed by the actor are described in greater detail above and below, but here it is noted that the same may be a VR/AR headset 146 with an appropriate associated display and computing environment. Generally controllers 148 will be needed such that hand movements (and thus arm and upper body movements as well, generally) may be inferred and displayed to the patron, or these may be visualized by an associated camera 163, either mounted on the headset 146 or placed externally. In general what is needed on the actor side is some way to capture the motion of the actor, either in a CG fashion or in a fashion that allows video capture, e.g., with the use of a green screen and camera using system 165 (see FIG. 7B).

In certain cases the level of interaction, which is generally set by a user or the user's representative in an introduction screen, may be employed to automatically adjust avatar appearance, volume of sound heard by the patron, and so on, so that the actor need not make such adjustments himself or herself. For example, in the case of a haunted attraction, a scary—but—cartoonish avatar may be employed for patrons desiring low levels of interaction, a scary but more realistic avatar may be employed for patrons desiring a medium level of interaction, and a gory and scary avatar may be employed for patrons desiring a high level of interaction. For patrons desiring extreme levels of interaction, haptic forces as well as a gory and scary avatar may further be employed. Where multiple patrons form a group and request different levels of interaction, that of the lowest level may be used, or in other cases different levels may be provided to different patrons, all based on the same actor action by having the levels of interaction be automatically adjusted for each patron according to their input setting.

Figure 9:
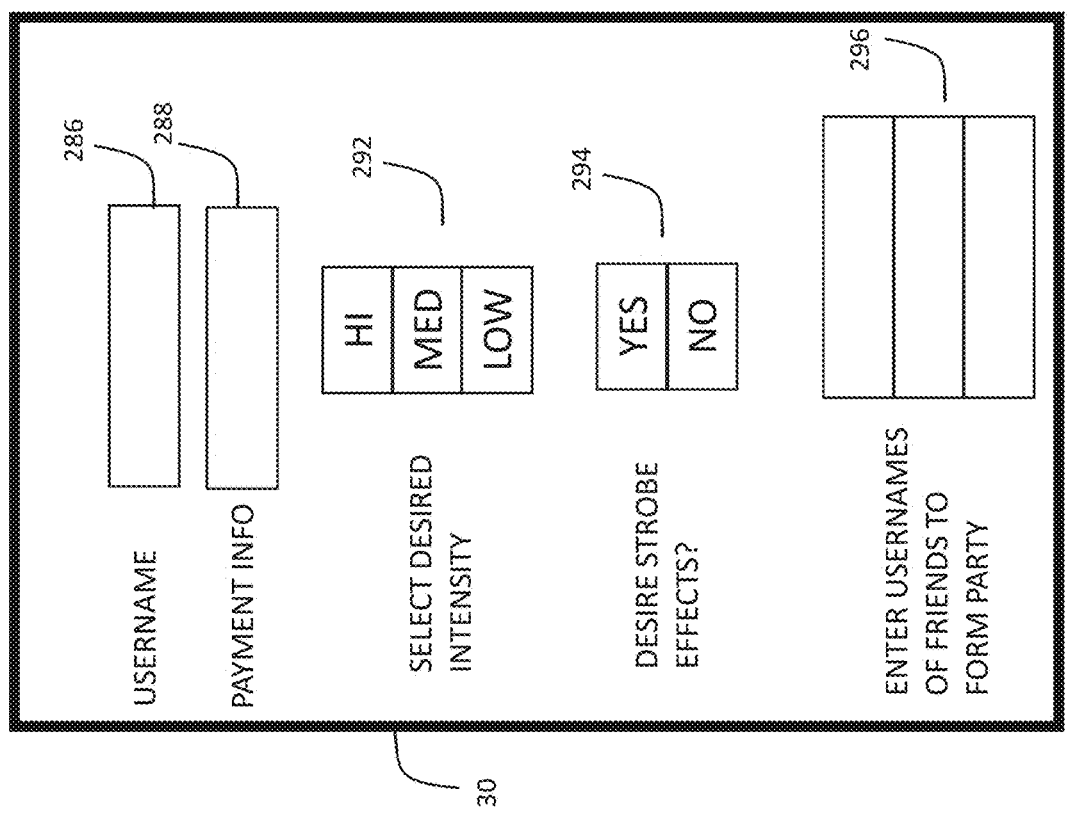
FIG. 9 shows another exemplary user interface according to present principles, illustrating an introductory screen allowing a patron to adjust aspects of the interactions in the maze experience, e.g., the intensity.

FIG. 9 illustrates an exemplary introductory screen 30 such that a user or patron may enter certain settings to be followed during the maze experience. Here the user may be enabled to enter a username 286 (which may be displayed above their avatar or used in a separate chat screen), payment information 288, the desired intensity via a set of buttons 292, an indication as to whether they desire strobe effects 294, as well as a form 296 to enter usernames of friends, so that a party can be formed.

And while the visual appearance of the actor avatar has been described above, it will be understood that audio emanating from the avatar (generally using 3D sound and with the audio source of the sound located at the location of the actor avatar, and the game object of the audio source may be located as a child object of the game object representing the avatar or other avatar rig) may similarly be graduated to perform various functionality. For example, the volume may be adjusted according to the level of interaction desired. In some cases, the sound may be modulated to raise or lower the pitch of the actor's voice, to appear to change the gender of the same or to provide scary sound effects such as are known in the field of audio effects. In this way, the actor need not overly stress their voice in trying to convey certain effects, e.g., a scream in the case of an interaction in a haunted attraction.

It will be understood that in alternative implementations the actor interface may be such that the future patrons are displayed horizontally. Again such may be automatically sorted by time to appearance, which may be calculated as the amount of time remaining before the patron or group of patrons (i.e., their avatars) present at the action pocket, which may be in part based on the distance between the action pocket and the trigger area, as well as the speed in which the patrons are traveling. This "amount of time remaining" is referred to in some implementations as a "characteristic time". In addition, the actor interface may also indicate the type of device employed by the patron, e.g., whether they are employing a VR or AR headset, or whether they are employing using non-headmounted devices.

Environment Visualization

CG

Figure 10:
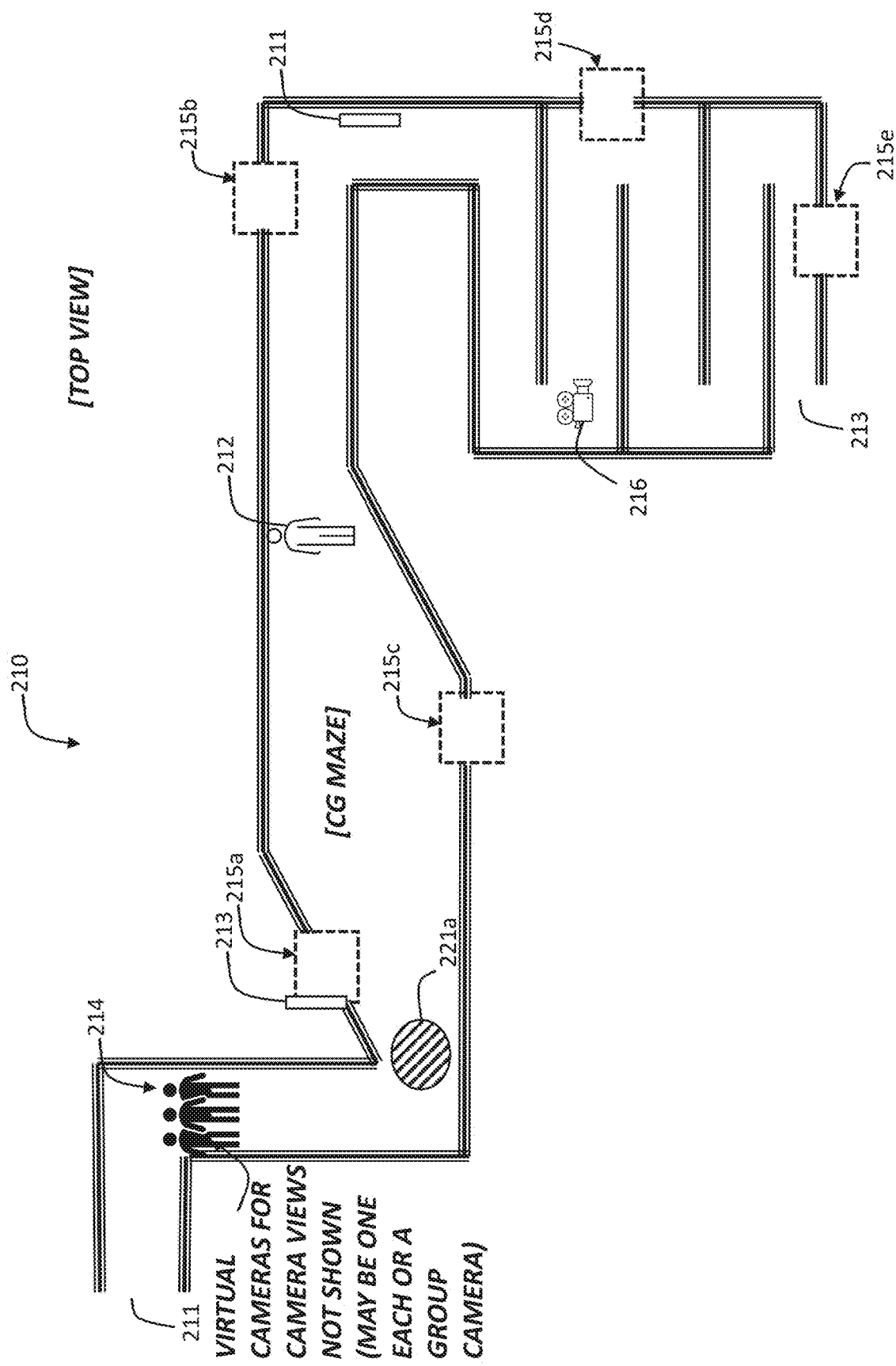
FIG. 10 shows a top view of another exemplary maze experience according to present principles, showing in particular a CG maze.

Another maze experience 210 is illustrated in a top view in FIG. 10, this one intended to illustrate a maze that is computer-generated. The same has an entrance 211, and an exit 213. Action pockets are shown, including pockets 215a-215e and a trigger area 221a. A group of patrons' avatars 214 is illustrated. What is not illustrated but will be understood is that each may employ virtual cameras to provide camera views of the CG maze. There may be one camera each, or they may each use the same camera, which may be termed a group camera. These are generally not actual cameras, but rather virtual cameras created by the system, e.g., server 131, or by the user computing environment, or by a combination. A single patron avatar 212 is also illustrated at another point in the maze (this avatar not being part of patron group 214). A further patron 216 is illustrated by a camera only, and here it is noted that patrons need not necessarily have an avatar associated therewith. If they do not have an avatar, they will generally be provided with some sort of mesh by the system so that the actor knows the location of the camera, and thus knows where to direct the interaction.

FIG. 10 also illustrates element 211, which is a video scene superposed atop the CG maze. Element 213 is an audio source, and the same may be the audio source used by the actor, particularly as the same is adjacent the action pocket 215a.

It is further noted that each element in this maze experience or environment may be kept track of by the associated computing environments including the server 131 by the use of game objects. For example, each avatar within the group pictured in 214 may be a game object, and each game object may be composed of multiple child game objects. Even empty game objects may be employed, although such often are employed to group together nonempty game objects. For example, an empty game object of "walls" may be employed to group together all of the game objects that form the walls of the maze. Game objects may further include menus and UI elements.

A CG environment is generally of a natural or man-made structure, e.g., a haunted house, corn maze, old hospital, or the like. But it can also be a CG re-creation of a person's locale, e.g., the home of the customer. Such can be created at runtime using cameras coupled to the HMD, for example, or such can also be created ahead of time, using known architectural visualization/digitization techniques. Procedural generation may also be employed, at runtime.

In more detail, CG environments may also be procedurally-generated, such that the same are generated shortly before a patron enters them. Such may be created before the patron or patrons begin a maze, or portions of the maze may even be created while the patron or patrons are in an earlier part of the maze, e.g., "on-the-fly". In some cases, some operators may desire that a patron or group of patrons take a constant amount of time to traverse an overall maze, e.g., 15 minutes, 20 minutes, 30 minutes, 45 minutes, an hour, and so on. In some cases though, patrons may vary in the speed in which they traverse the maze. In this case, procedural generation can lengthen or shorten the maze, to ensure that the patrons complete the maze in the desired time. In an alternative embodiment, the set time duration to traverse the maze may be based on the price paid for admission.

Figure 11:
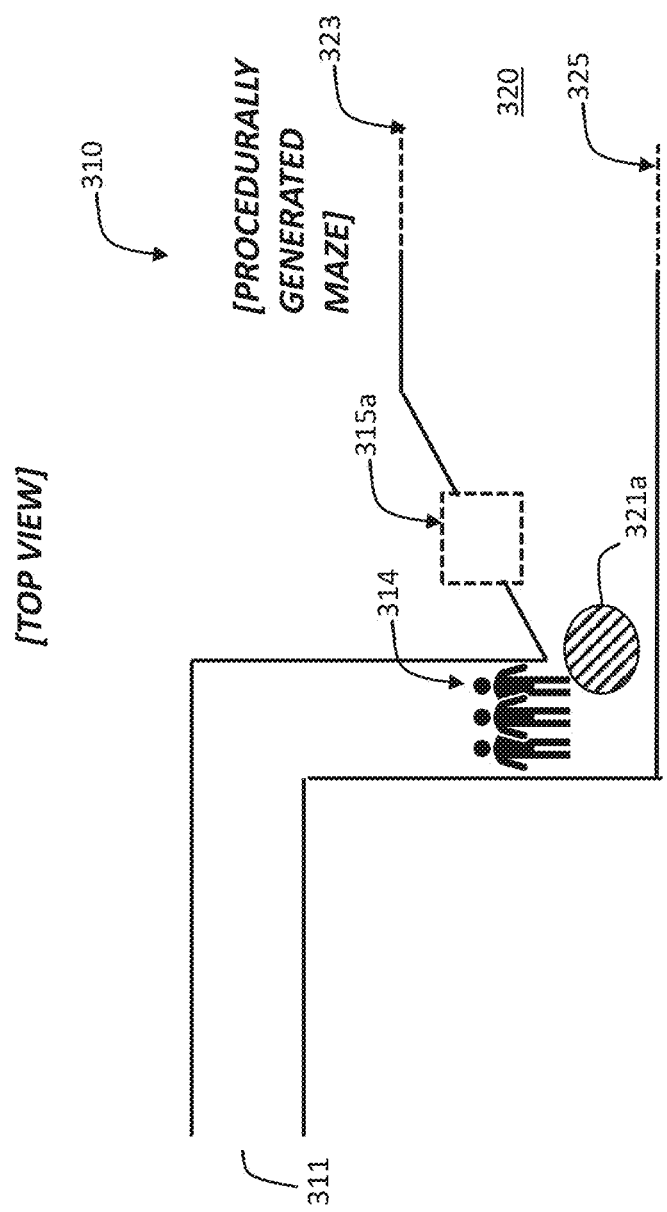
FIG. 11 shows a top view of another exemplary maze experience according to present principles, showing in particular a CG procedurally-generated maze.

A portion of a procedurally-generated maze is illustrated by the maze 310 of FIG. 11. At the point seen in the figure, the maze has an entrance 311, and a group of patrons' avatars 314 are about to interact (or have their collider(s) interact) with trigger area (or volume) 321a. This may then cause the instantiation of an entry on the actor interface employed by an actor, and upon appropriate activation of a link, the actor avatar may be instantiated within the action pocket 315a. But as this maze is procedurally-generated, it is only a small portion beyond the action pocket 315a that is actually created. This section is procedurally-generated section 320 with boundaries 323 and 325. The procedural generation can take place at various times, e.g., a section may be created whenever a patron or group of patrons encounters a trigger point, constantly over time, or the procedural generation can also be dependent on the speed of patron travel. Other ways to determine the speed of procedural generation will also be understood. As noted, procedural generation may be employed in some cases to allow a certain level of control over the amount of time a patron takes to traverse the maze. For example, a user's admission ticket may be good for a one hour maze. Procedural generation can be employed to ensure that the maze ends at the one hour mark. It will be understood that procedural generation would provide not only generation of maze environments but also trigger areas, action pockets or other actor instantiation points, nonplayer character (NPC) creation, such as monsters in the case of a haunted attraction, and the like. Such may be in turn employed to cause the instantiation of an entry on the actor interface.

In some cases, where a maze represents an actual locale, if the user is physically in the locale, the maze may be CG generated, or may have CG elements displayed on an AR HMD (more on this embodiment below), but the patron may traverse the same by physically walking through the actual locale and having the movements translated into movements in the CG version of the locale. In this case, it may be convenient to occasionally (e.g., every two minutes, five minutes, 10 minutes, and so on) operate the camera on the HMD for a short period of time (e.g., one second, five seconds, 10 seconds, 30 seconds, and so on) so as to allow a degree of calibration or alignment to occur between the CG maze environment represented in the computing environment, headset, server, or a combination, and the actual physical environment. This is because over time, HMD tracking may slip to a certain extent, and become not faithfully representative of the actual locale of the user. In a VR setting, this is problematic because such is the only view the user has their surroundings. If the slipped tracking no longer faithfully represents the surroundings, e.g., has shifted due to incorrect or inaccurate tracking, the user may end up running into a wall or tripping over furniture. Thus it may be important to occasionally operate the camera to allow a resynchronization/recalibration to occur.

Actual or Real

The environment may also be actual or real, and data pertaining to such an actual or real environment would generally be video data that is displayed within the HMD, particularly if the same is VR. An actual environment may also be portrayed or displayed in an AR HMD, as noted above, however, in many cases the same is superfluous as AR glasses already allow a visualization with perfect fidelity of an exterior environment. However, in some cases, the user may only have AR glasses but wish to be immersed in a different environment. In this case, the AR glasses may substantially act as VR glasses, and block out as much as possible of the scene other than certain elements within the scene desired to be visualized and displayed.

As noted, the environment may be actual or real, and in this case video data is displayed within the HMD. CG elements may be displayed atop or superimposed on top of the video data, and thus may serve the purpose of adorning the video environment so as to make the same appear more suited to the performances or interactions. For example, such adornments may constitute assets superimposed on the video so as to change the view of the displayed scene, e.g., changing a house to a haunted house, changing a hallway to a scary hospital hallway, and so on.

Where the environment is actual or real, patron movements within the environment have to be detected and represented. In some cases, if the patron has a large empty space available, or is within the re-created locale, the patron may walk and have their movements translated into movements in the actual or real environment. For example, the actual or real environment may be an environment portrayed by a video feed of a house, decorated, either physically or in CG, to be a haunted house. The patron may visualize a video of the haunted house, even though they are standing in a regular house or elsewhere, e.g., in a large open section of their driveway. Patron movements may be translated into movements in the haunted house. In some cases the movements may be one-to-one, where if the user moves 1 foot in the driveway they also move 1 foot in the haunted house. Alternatively, the user may be caused to move more or less then their accompanying and associated physical movements in the physical space. In another embodiment, the user may employ a joystick or other controller to facilitate movement. In yet other embodiments, accelerometers may be employed to detect movement, or other sensors such as may be employed on a, e.g., multidirectional treadmill.

To visualize what the user is seeing in the actual or real environment, various techniques may be employed. In one, if the actual or real environment is available for physical occupation, a camera on a robot, controlled by the joystick or user movement, may move through the actual or real environment, causing the change of view. Real or virtual actors may then perform to the robot. If real, the actor simply acts as if the patron were at the location of the robot or camera attached thereto. If virtual, either CG or a video representation, the visual data corresponding to the actor is overlaid atop or superimposed upon the camera view of the environment.

As noted, various CG elements may be employed to "dress up" the actual or real environment, to increase the sense of user immersion. Other ways of visualizing what the user is seeing in the actual or real environment, particularly as the view changes due to user movement, is through the use of light field cameras. A light field camera that has imaged a volume such as a room allows a faithful and true re-creation of a view from one or more other points in the room. Put another way, use of a light field camera allows a general or arbitrary view from a point in the room, such as a point chosen by a user through user movement or use of a joystick, to be re-created. In some cases, if a user moves into another room, another light field camera image can be subsequently loaded into memory and used for portrayal of the view in the room for the user. In the event that a more "traditional" 4 pi steradian or 360 degree or 180 degree camera is employed, the user may still experience a sense of immersion as they traverse through the maze, but it will be as if the user or patron is on a "rail", such that they can move along the rail but not in arbitrary locations within the room off of or away from the rail such allows 3-dof but not 6-dof movement, as described below. Of course, it will be understood that even in such "traditional" situations, multiple rails may be provided with appropriate branching points such that the user may move from one rail onto another using an appropriate user interface in their display, e.g., their AR or VR HMD or computer display, or using an appropriate user interaction caused by a controller, keyboard, mouse, or the like.

Figure 12:
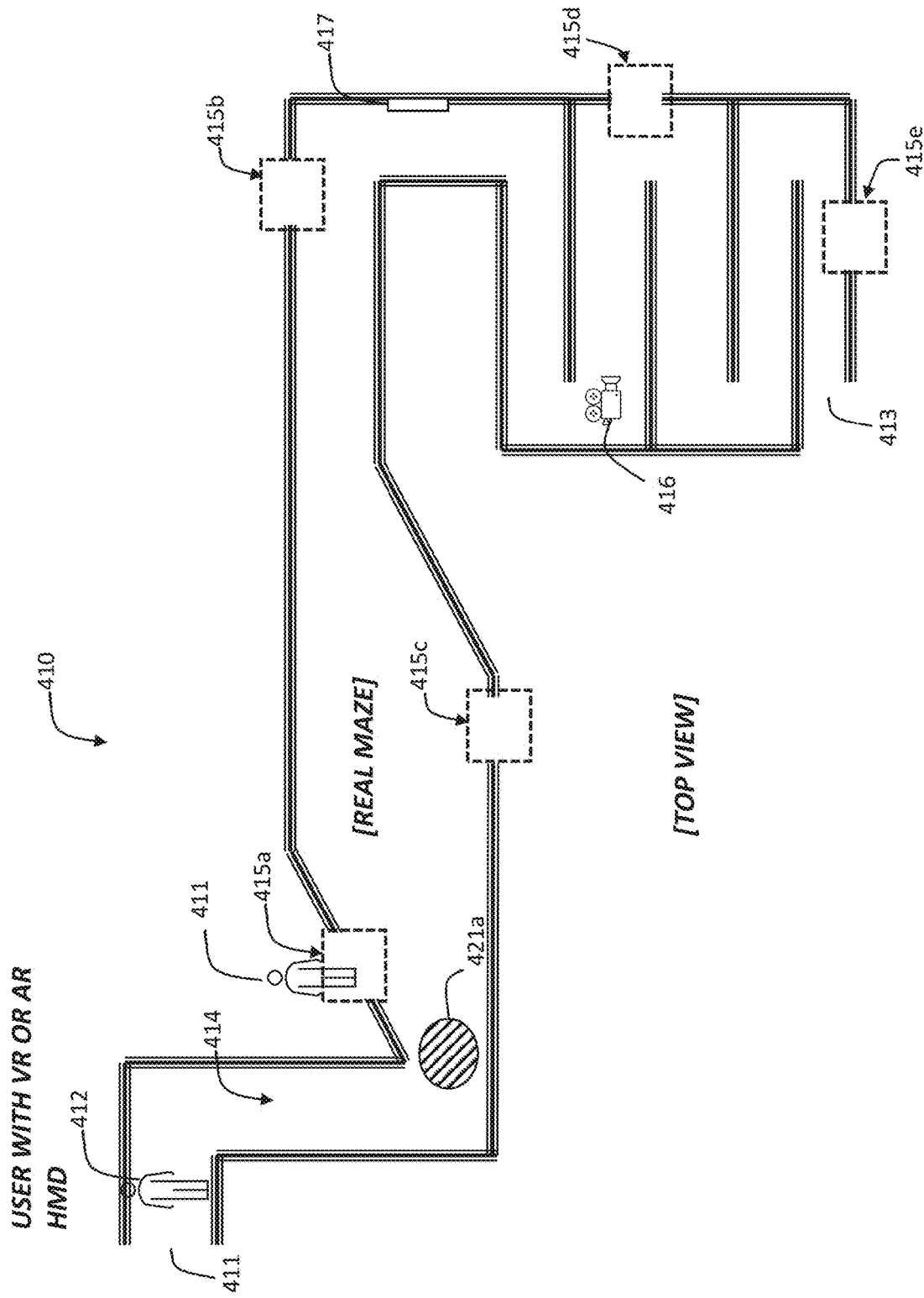
FIG. 12 shows a top view of another exemplary maze experience according to present principles, showing in particular a maze that is real, actual, or physical. Such a maze exists in the real world and a video or CG reconstruction of the same is employed to create a maze experience.

FIG. 12 illustrates a real or actual maze 410. The real maze 410 is an actual physical area, though CG elements may be employed as have been described. The maze 410 has an entrance 411 and an exit 413. A user 412 is pictured, at the entrance of the maze. After traversing the path 414, the user's avatar 412 will collide with trigger area 421a, which as noted will set in motion processing that will result in, at some point, an actor avatar 411 instantiating within the action pocket 415a. Other action pockets 415b-415e are also illustrated. An element 417 is shown, which is a CG element superimposed atop the real maze.

The real maze 410 may be imaged either directly, in video, or as a CG creation/construction or reconstruction. The same is generally displayed to the user using an associated HMD, e.g., a VR or AR HMD, or other display. FIG. 12 also illustrates an actual physical camera 416 operated under control of a robot that is negotiating the real maze 410 under control of a user. In other implementations, the user 412 can locomote either physically or virtually. If the user 412 is employing a VR or AR headset and locomoting physically through the locale, then the locale interior can be viewed actually (using AR glasses), as a CG reconstruction, or as a video feed. Other details are described above. If the user is locomoting virtually, then the user may or may not be embodied by an avatar, and in this case traversing the interior of the locale can occur in a number of ways. These are described in connection with Table I and throughout this specification.

In particular, Table I is an exemplary non-limiting list of various types of maze experiences along with corresponding type of environments and locomotion schemes. In the case of a virtual maze, which may be CG generated or video generated or both, generally no physical locale is present to actually traverse through, though the virtual maze can be based on a real place. However, there is generally no capture of the visual data about the place taking place in real time by the user walking through it. Layout data may still be obtained, however. In this regard it is noted that a common reason to have a real (also termed physical or actual) maze is so the user or a camera can walk or otherwise traverse through it. Generally or in many cases, if the user (either physically or via a real or physical camera) is not physically walking or otherwise traversing through the maze, it may reduce to the case above of a virtual maze, and this case is discussed above. And generally, if the user is traversing the maze, the user through an AR glass or camera or other such sensor (directly through AR goggles or indirectly through a video feed or realtime CG reconstruction) is receiving visual or layout data from the physical maze itself, in real time, as they are walking or traversing. The visual data may be of a hallway, room, field, and so on. Layout data may be data corresponding to location data, e.g., where the user is in the physical maze. This data may be generated entirely by the headset in the case of simply accelerometer data, or may be combined with other sensors, such as cameras or GPS or using monitoring of other locomotion data described herein. Generally, a purpose for traversing an actual locale but having the entirety (or most thereof) of the structure replaced with CG or video elements is that the user may desire that their locale, e.g., house or apartment, be the environment for a maze experience, but they may desire that the entirety of their house or apartment be replaced with experience-suitable decor. Thus, a hallway of a house may be replaced with a hallway of a castle. A bedroom may be replaced with a throne room, and so on. In this way, if the user brushes up against a wall in real life, they will also brush up against a wall in the maze experience, thus significantly increasing the immersion.

Actor Visualization

Video

If a video of an actor is to be employed in the situation of a video of an actual or real or physical attraction or maze, in which the actor is physically in the maze, then no green screen is needed, as generally the video of the actor captures the video of the maze, or vice versa. In other implementations, the actor may be filmed separately, e.g., with a green screen. In other words, if the video of the actor is to be employed where the actor is outside of the attraction, then it may become necessary to use a green screen so as to extract the video of the actor from the remainder of the scene.

If video is used for either purpose, i.e., for either the maze or the actor (though more commonly the maze), then a light field camera may be employed to allow and enable the creation of the image (video image) of the scene, so as to allow arbitrary perspectives for the user. In particular, the light field camera may be employed to allow and enable the creation of the portion of the image created in video, which may then be superposed on any or all CG portions of the image, or vice versa. For the avoidance of confusion, here it is noted that the camera visualizing the maze for the customer need not be a light field camera, necessarily. It may be a camera such as a 180 or 360° camera, or the like, mounted on a robot controlled by the customer in real time, or it may be a 180 or 360° camera, or the like, that has been caused to move through the maze so as to capture initial visualization data, in which case the same is said to be operating (thereafter) on a virtual "rail", as described above, because its path is thereafter predefined to be that of its initial capture journey. However, in the case where prior video footage is employed, e.g., where a visualization of an actual maze is created but then this actual maze is not accessed again for real-time patron usage, then the use of a light field camera to obtain the prior video footage of the maze may be employed to allow the faithful re-creation of an image of this maze from any angle or location. This facility then allows the user to move around the interior of the maze and to see an accurate representation of the interior from any arbitrary angle or from any vantage point, again substantially increasing immersion.

Digitization

Three Degrees of Freedom

Some early VR headsets allow only three degrees of freedom ("3-dof"), and thus allow rotations of an actor's head to be portrayed, but not translations or longitudinal/transverse movements thereof. While less immersive for the user, such may still be employed to provide some level of interaction, e.g., scares, particularly where the actor does not need to approach or appear to come closer to the user or patron as part of the interaction. Longitudinal or transverse movements may still be accomplished by way of the actor using a joystick or other technique in which longitudinal or transverse motion data may be entered into the system employed by the actor. It is noted that what is being discussed here is the headset worn by the actor, in some implementations, to allow movement of the actor's head, to allow the actor to move towards the patron as part of the interaction. The user similarly may also be wearing a VR or AR headset, to increase their immersion, but such is unrelated to the use of a headset on the actor to detect actor head movements and translate the same into movements of the actors avatar as part of the interaction. But similarly, a user employing a 3-dof headset may rotate their angle of view about three axes, but generally cannot move their head view relative to the location of the view in a transverse or longitudinal direction, without a separate movement system or means, e.g., a controller with a joystick. In the same way, when the view is from a virtual camera on a rail, such movements are generally prohibited unless multiple rails are provided. It is noted that 3-dof headsets may also employ controllers for use by each of the user's hands, and such may be employed not only for input but also to visualize the user's hands. Alternatively, cameras may be employed to visualize the user's hands. In either case, the controllers may be worn to allow inputs by the actor into the actor interface described elsewhere.

Six Degrees of Freedom

Newer VR headsets generally allow for six degrees of freedom ("6-dof"). In this case, longitudinal and transverse movements in three dimensions can also be detected and portrayed as actor movements, along with the three axes of rotation of a 3-dof system. As noted above, controllers or cameras (either external or mounted to the headset) can be employed to image hands and cause the display of user hands. 6-dof can also imply upper body movement, because if the head is moving, it is generally moving at least the upper body in a predictable and representable direction, i.e., moving the head often involves moving the upper body along with it. Exemplary lower body movements can be implied based on upper body movements, although such are generally somewhat more disconnected and unrelated from the movements of the upper body. For particularly advantageous motion capture however, suits imaging the entire body or a portion of the body may be employed to more faithfully capture the movements of the actor, and allow a particularly advantageous representation of actor movement as a corresponding avatar movement for the display and enjoyment of the patron or patrons. In some cases, controllers may be used for hands and upper body, and other motion tracking may be employed for the lower body, e.g., through motion tracking shoes or other lower body articles of clothing. In this way the entire body can be motion tracked.

In addition, while it is noted that cameras may be employed to visualize the controllers or user hands or portions of bodies or even entire bodies, other sensors may also be employed for this purpose, particularly including accelerometer sensors, e.g. for the detection of relative movements (movements relative to an initial position, but where absolute positions in space may in some cases remain unknown).

Patron/User/Customer Movement

Users can move under actual movement if enabled under 6-dof, or they can use a joystick. In the first case, users may walk through a large open space, and their movements can be recorded by cameras and employed to cause movement in an associated CG space or environment, which is also termed a "common environment" if multiple users are involved. Instead of a large open space in which the user traverses, alternatively, a multidirectional treadmill may be employed. The cameras may either be external to the user within the space, or the cameras may be mounted on the HMD and detect relative movement and use the same to cause corresponding movement in the CG environment. Where a multidirectional treadmill is employed, the degree and direction of movement may also be drawn from sensors in the treadmill, from a pedometer worn by the user, from cameras imaging gait, and so on. Where a joystick is employed to cause movement, patrons may be stationary, seated, and the action of the user-operated joystick may cause the movement to appear in the CG space. Additional details are described in Table I.

TABLE I

| Types Of Maze Environments (Experiences) | Subtypes of Virtual Mazes | Subsubtypes of Virtual Mazes (if any) | Types of Locomotion | Subtypes of Locomotion |
|---|---|---|---|---|
| Virtual Maze (AKA artificial, non-physical) AKA artificial, non-physical, in this, | CG Generated | | Controller, joystick or other keyboard control | Teleportation (user with controller/joystick pointing at desired location. Continuous movement |
| | | | Actually walking, traversing a distance, and detecting traversal (e.g., in a large room, room scale VR, and so on.) | Cameras Accelerometers, e.g., pedometer GPS |
| | | | Actually walking, but not traversing a physical distance, and detecting an amount of distance that would have been traversed | Accelerometers, e.g., pedometer Multi-directional treadmill with sensors indicating effective distance traveled. Cameras or sensors to measure walking-in-place with gait analysis and thus effective distance travelled |
| | Video Generated | Light field camera 180/360 degree camera on a (virtual) rail or with multiple rails | Same as above | |
| | Combination of CG and Video | Mostly video with CG elements Mostly CG with video elements added | | |
| Real Maze | User physically walks through maze | AR glasses or similar HMD view environment; CG or video components may be overlaid, including actors/action pockets | Actually walking, traversing a distance, and detecting traversal (e.g., in a large room, room scale VR, and so on.) | AR glass Cameras to detect and translate movement |
| | | VR (in either case CG or video components or both can be overlaid on environment, including actors/action pockets. | Through pass camera employed to visualize environment, at least in part Environment could be completely CG or video generated (or a combination) (using structure geometry but replacing appearance) | | Accelerometers, e.g., pedometer, to detect and translate movement GPS, to detect and translate movement |
| | Instead of user, physical camera traverses maze | In this case the user may in some cases employ a VR HMD that is receiving a 180° or 360° camera view of the maze. Robot could be under control of the user or could operate along set path. While a light field camera may be employed, there may be less reason here, as the user can locomote to different locations, and thus there may be less of a need to recreate the view from arbitrary locations. | Controller/joystick Actually walking, traversing a distance, and detecting traversal (e.g., in a large room, room scale VR, and so on.)

Actually walking, but not traversing a physical distance, and detecting an amount of distance that would have been traversed | Continuous movement, but generally not teleportation. AR glass (in the case where the AR glass is fitted to the robot camera) Cameras to detect and translate movement Accelerometers, e.g., pedometer, to detect and translate movement GPS, to detect and translate movement Accelerometers, e.g., pedometer Multi-directional treadmill with sensors, indicating effective distance traveled. Cameras or sensors to measure walking-in-place with gait analyses and thus effective distance travelled |

A group of customers can be slowly automatically moved through a desired path (on a 'rail') so as to ensure throughput thru the maze. Even if on a rail, the users may be enabled to move locally (such as within a defined area) while the defined area is moved along the rail or other such predefined path. Thus, users can move within the defined area but can be prohibited from moving off of the defined area. In some cases, customers can be prohibited from backward movement so as to not cause issues with the actor trigger system described elsewhere. That is, it may be generally desired in some embodiments that users approach actors from a particular direction, and a user moving backwards may end up approaching the action pocket before hitting the trigger, and in this case the actor may be unprepared for any interaction. In addition, it is well known in haunted attractions that it is desired to "scare the patrons forward", through the maze, rather than backwards, where they may encounter other patrons.

Where a defined area is moved along a rail at a particular pace, the operator of the themed attraction or maze may be enabled to almost "dial in" how much revenue is desired, and may simply move patrons along at a speed that allows a certain rate of revenue to be received on a per hour or per day basis. For example, in one calculation:

$$\text{Dollar\_Revenue/hour} = \$\text{Admission\_Price} * \text{Customers/hour} = \$\text{Admission\_Price} * (R/D) * \Sigma N_i$$

Where R is the speed of the defined area, D is the length of the maze, and $N_i$ are the number of patrons in each group. The sum is over all of the groups in a particular hour.

Examples

VR Haunted Attraction

Similar to that displayed in FIG. 7A, a maze may be created using computer graphics and known 3D modeling techniques, and so-called scare actors may be situated within scare pockets to jump out and scare patrons as patrons traverse through the maze. The actors may be notified of when patrons are arriving by way of the trigger areas described above. One actor may be enabled to jump between multiple scare pockets so as to allow that one actor (or a subset of actors using multiple actor interfaces) to provide multiple interactions within the maze. The one actor may employ different avatars, however, to change their appearance and thus make it appear that it is different avatars that are appearing in each action pocket. Moreover, while typically a scare actor would employ their own voice, such may be modulated (or not) to further allow the actor/avatar to appear differently than they did before. For example, an actor's voice may be modulated down to approximate zombie groans or modulated up to sound more like a "bride of Frankenstein" character.

AR Home Haunt

In some implementations this example may provide the most intense scares. A user has AR glasses (also variously termed herein as goggles or a headset or an HMD) and traverses their home, while the system analyzes the view of the interior of the home for the presence of doors, hallways, cabinets, alcoves, or the like. Being based on a video feed from the viewpoint of the user, such are detected from the standpoint of the user or customer. Such may then be analyzed as being potential locations for patron/actor interactions, e.g., scares, at least from the aspect of a jump scare or startle scare. The system may detect these areas, create a virtual scare pocket, and the avatar of the actor may be caused to occupy the virtual scare pocket, i.e. may be caused to instantiate within the action or scare pocket using the actor interface, such that the actor avatar is not visible from the standpoint of the camera representing the viewpoint of the patron (e.g., patron's avatar). When the patron is adjacent or near the virtual scare pocket, and some implementations having activated a trigger in a trigger area or volume, the actor may cause the avatar to emerge therefrom in a sudden fashion, scaring the patron.

Other, Including Haptics, Sound, and Programmed Actions

Besides the patron, user, or customer visualizing the actions of the actor as portrayed by a video or a CG avatar, the user or customer may "feel" the actions using forces or vibration from a haptic device such as a haptic glove, haptic vest or haptic bodysuit. A certain level of haptic forces or other interactions can be enabled on, e.g., VR or AR controllers or a game controller. This can increase the level of immersion somewhat, and the use of a haptic device such as a vest or bodysuit can increase the level of immersion even more. Additional details regarding haptic interactions are described below in connection with FIGS. 15-21. Appropriate permissions may be provided by the user or customer upon signing up for the themed attraction so as to provide permission (or not) for the actor's movements to cause transmission of haptic feedback or haptic motions through the haptic device. In certain cases, if desired, the patrons may be enabled to cause haptic forces on the actors, if the actor is similarly provided with a haptic device.

Sound and lighting are key features of many performances, including haunted attractions, and the same may be adjusted to either increase or decrease the scare level. For example, additional lighting may be employed to reduce a scare level. Strobe lights or other effects may be turned off as part of the user introductory settings interface in order to reduce the deleterious effects such may have on causing seizures or the like.

As noted with regard to buttons 279 in 281 of FIG. 8, certain actions of the actor's avatars can be preprogrammed in the sense that the actor need only push a button to cause a particular visual or audio effect, e.g., a popping of the eyes or a scream or a jumping movement. However, in most cases it is desired to have some personal human movement behind the actor, even if just the choice of when to cause such actions, so that the patron is always aware of the unpredictable nature, thus significantly increasing the scare factor.

Figure 13:
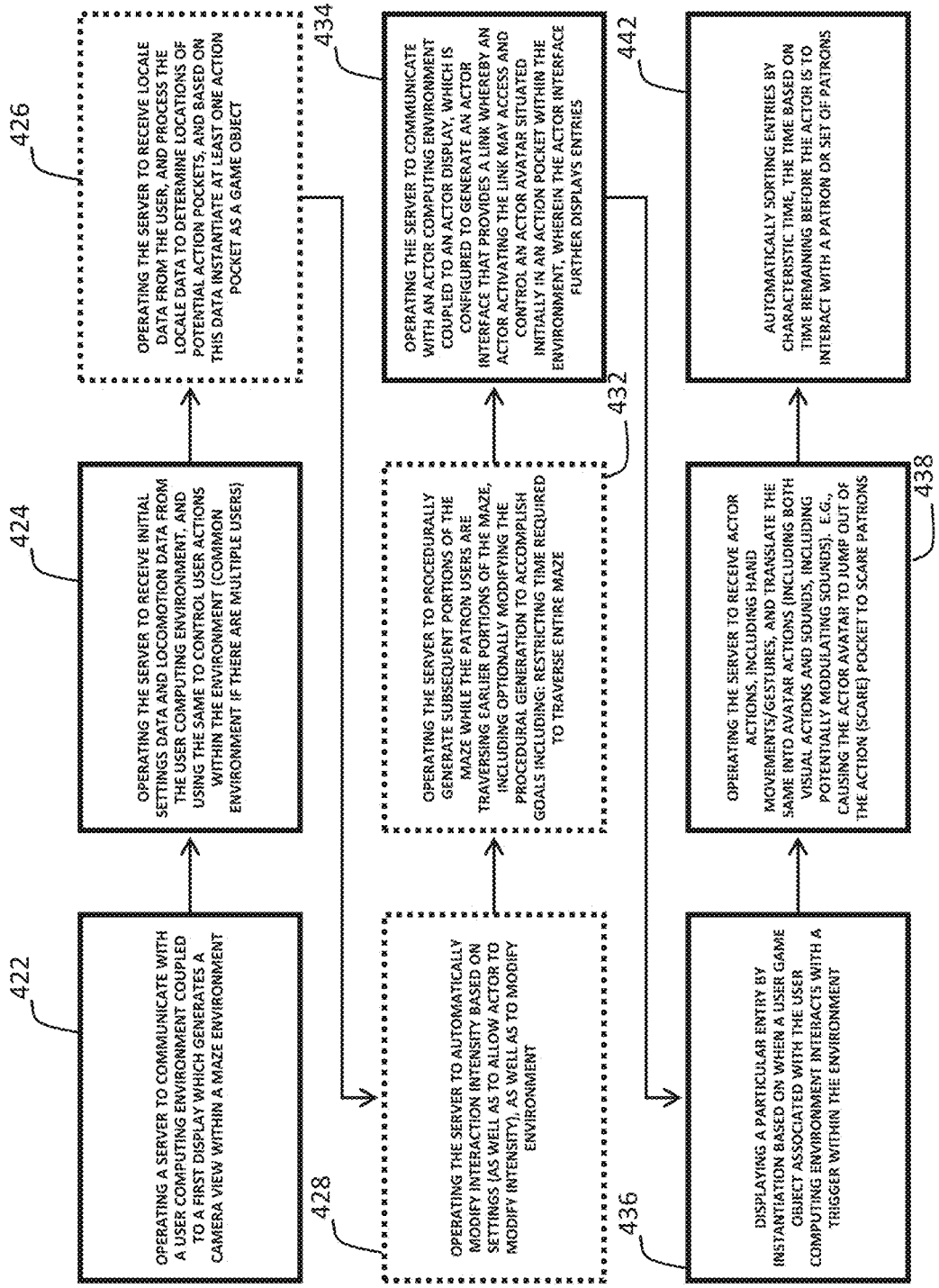
FIG. 13 is another flowchart of a method according to present principles.
Figure 14:
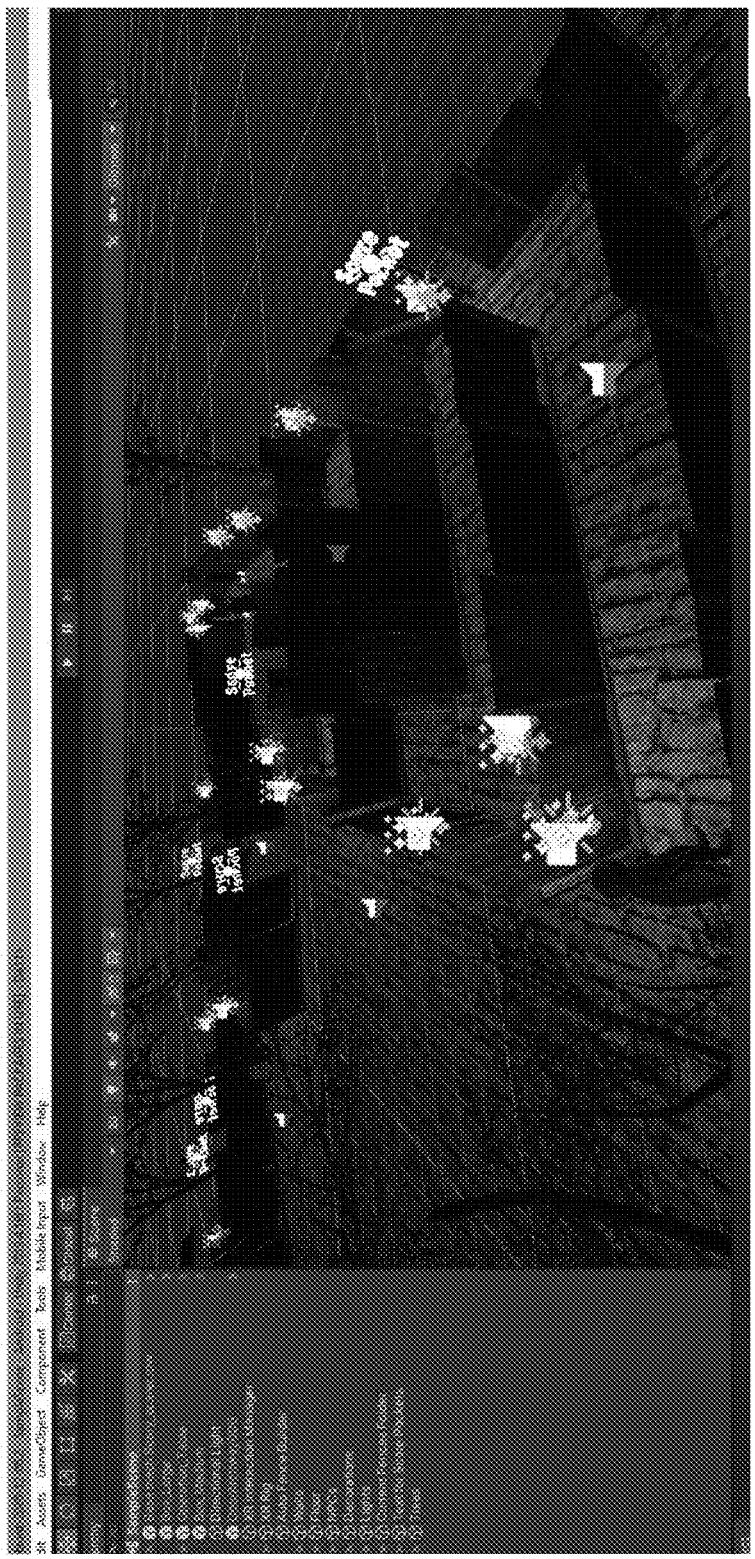
FIG. 14 shows a screenshot of an interactive maze with action/scare pockets according to present principles as developed within the Unity game engine.

FIG. 13 illustrates a flowchart of a general method of the invention. In a first step, a server may be operated to communicate with the user computing environment coupled to a first display which generates a camera view with a maze environment (step 422). The server may then be operated to receive initial settings data as well as locomotion data from the user computing environment, and the server may use the same to control user actions within the environment (step 424). The environment may be termed a common environment if multiple users are employed. The server may then be operated, in an optional step, to receive locale data from the user, and to process the locale data to determine locations of potential action pockets (step 426). Based on this data, an action pocket may be instantiated as a game object.

In yet another optional step, the server may be operated to automatically modify interaction intensity based on user-entered settings, and may further modify the environment based on the same settings (step 428). Actors may be enabled to modify these levels as well, using the actor interface or other such.

In yet a further optional step, the server may be operated to procedurally generate subsequent portions of the maze while the patrons are traversing earlier portions of the maze (step 432). This step may include optionally modifying the procedural generation to accomplish goals including maintaining a relatively constant amount of time for patron traversal of the entire maze experience.

In yet another step, the server may be operated to communicate with an actor computing environment coupled to an actor display, which is configured to generate an actor interface that provides one or more links wherein an actor activating the link may access and control an actor avatar (step 434). The actor avatar may be situated initially in an action pocket within the environment. The actor interface may further display one or more entries, each entry corresponding to a patron or group of patrons.

In a next step, a particular entry may be instantiated based on when a user game object associated with the user computing environment interacts with a trigger within the environment (step 436). For example, if a patron avatar (game object) having a mesh or other collider component is detected to collide with a volume representing a trigger volume, then the entry may be instantiated on the actor interface.

The server may be operated to receive actor actions, including hand movements, and to translate the same into avatar actions, including both visual actions and sounds (step 438). For example, these actions may be caused by the actor and may cause the actor avatar to, e.g., jump out of the action or scare pocket to scare patrons. In yet another step, the entries in the actor interface may be automatically sorted by characteristic time, which may be a time associated with a time remaining before a particular actor is to interact with a particular patron or group of patrons (step 442).

Other Aspects

Various terms have been employed in this description with adjectives such as "real", "actual", "virtual", "physical", "nonphysical", and the like. Generally, terms such as real and actual and physical refer to items, structures, buildings, cameras, and so on, that exist in real space and that can be handled or traversed by a human. Terms such as virtual generally refer to items, structures, buildings, cameras, and so on, that exist, but exist as digital constructs in databases, occupying memory identified by storage addresses, in the same may be stored in hard drives, tape drives, solid-state storage devices, RAM, ROM, CD-ROM, DVD, DVD-ROM, and so on.

In other variations, while it is noted that the term "action pocket" has been employed herein, there need not be a separate location in the virtual or actual maze identified by such a term. In some cases, an actor may simply be caused to appear at instantiation point as controlled by the link on the user interface, and the instantiation point may be within an action pocket, within the maze itself, at an interface between the two, and so on.

Chat functionality, either via a text box or via party chat, may be employed, so that patrons in a group can talk to each other. In addition, the chat functionality can be employed in such a way that the actor is added to the party group at the time of actor avatar instantiation into the maze or at an associated time, e.g., when the patrons are adjacent in action pocket or within a predetermined distance of the actor, such that the patrons can hear actor utterances. In this case, it may be preferable to obfuscate or otherwise obscure the existence of the actor in the chat channel. Alternatively, the actor may vocalize an utterance and all patrons within the maze may be enabled to hear, although in some cases the sound will be attenuated by virtual distance. 3D audio sources can accomplish this directionality and tapering/drop-off. In other cases, the actor may have control as to what patron or group of patrons can hear vocalized utterances. In yet other cases, a custom system may be employed such that an instantiated avatar may vocalize utterances and be heard by party members outside of the chat channel functionality.

In another variation, the actor interface can allow the actor to custom select which maze and action pocket (or instantiation point) to instantiate at using the noted links.

Where avatars have become more widely used and where a user can use an avatar for multiple apps or applications, their desired avatar may be employed for purposes of populating the maze, or they may be provided an avatar, which may be customizable as noted above. In some cases, if a user adopts a particular avatar or clothing for their avatar, such may be noted in the server 131 and further noted in the actor interface and caused to automatically have an influence on actor actions, interactive experience or interaction intensity, and so on. For example, if a patron wears a particular theme of costume, e.g., a Victorian-themed costume, the actor avatar may adopt an analogous appearance, e.g., may appear in analogous clothing, or may appear as a Victorian character such as Jack the Ripper, instead of, e.g., a crazed clown.

In yet another variation, in the event of a bad connection (generally determined by a diagnostic test which can be administered before or during the maze interaction or experience) the system may automatically switch to a next available actor, also employing a corresponding actor interface.

In another variation, the system may populate the actor interfaces based on load-balancing, so that the average amount of "characteristic time" is maximized or equalized (or both) between all the actors.

It is noted that certain other terms have been used, and while definitions are not intended to be limiting, it is noted here that the term "teleportation" is intended to mean a variety of locomotion within VR or AR (or certain other computer application modalities concerning virtual environments) where a user is enabled to point at a location using a controller or their finger or joystick or other indicator and to immediately have their avatar transported to the location pointed at. In addition, terms such as "AR glass" is intended to mean a partially see-through display or window (which may be constituted of glass, plastic, a combination, or the like) which allows a user not only a view of an external environment but also data visualizations like) where visualization elements may be overlaid atop the environment, where the visualization elements may be CG, video, or the like. AR glasses may be employed by actors, patrons, operators, and so on.

In one aspect, the invention is directed towards a system for providing a virtual reality experience, including: a set of motorized pads for coupling to respective feet of a user; a means of communication between the set of motorized pads and a computing environment operating a virtual reality headset; such that the set of motorized pads are configured to provide pressure on a user's feet as an avatar within a virtual environment traverses the environment.

Implementations of the invention include one or more of the following. The means of communication may be an RF link or a wired link. The avatar may be a player character in a videogame or a character in a virtual tour. The set of motorized pads may include a left pad and a right pad, corresponding to a user's left foot and right foot, and the set of motorized pads may be configured to provide pressure on the user's left foot as an avatar within the virtual environment steps down on the environment with their left foot, and where the motorized pads may further be configured to provide pressure on the user's right foot as an avatar within the virtual environment steps down on the environment with their right foot.

In another aspect, the invention is directed towards a method of providing a multiuser virtual reality experience, including: configuring a server to communicate with a first user computing environment, the first user computing environment coupled to a first virtual reality headset, the first user computing environment configured to generate a first avatar corresponding to the user, the first avatar situated within a common environment viewable in the first virtual reality headset; and configuring a server to communicate with a second user computing environment, the second user computing environment coupled to a second virtual reality headset, the second user computing environment configured to generate a second avatar corresponding to the user, the second avatar situated within the common environment viewable in the second virtual reality headset.

Implementations of the invention may include one or more of the following. The method may further include configuring the server to allow the first user to provide a tour to the second user. The configuring the server to allow the first user to provide a tour to the second user may include configuring the server to cause the second avatar to automatically follow the first avatar as the first avatar moves within the common environment. The server may be a social networking server. For example, where the server is a server of a social networking site, the same may allow the first user to indicate entries on a social networking page corresponding to the first user, and to provide audio commentary before, during, or after, the indication. The tour and the audio commentary may be recorded for later playback. The indication of entries may be via the first avatar pointing at an asset corresponding to the entry. The entries may include textual entries, audio entries, photographic entries, or video entries. The method may further include receiving an asset from a third-party source distinct from the social networking page corresponding to the first user, and configuring the server to allow the tour to include the received asset.

In another aspect, the invention is directed towards a non-transitory computer readable medium, including instructions for causing a computing environment to perform the above method.

In another aspect, the invention is directed towards a method of providing a multiuser virtual reality experience, including: configuring a server to communicate with a first user computing environment, the first user computing environment coupled to a first virtual reality headset, the first user computing environment configured to generate a common environment viewable in the first virtual reality headset; and recording a tour including audio data as the first user describes the common environment.

Implementations of the invention may include one or more of the following. The server may be a server of a social networking site, and the common environment may include visual depictions of entries from a social networking page corresponding to the first user, and the method may further include configuring the server to allow the first user to indicate the entries and to provide audio commentary before, during, or after, the indication.

While haunted mazes have been the subject of much of the discussion here, it will be understood that other experiences may also be used, including theatrical experiences, educational experiences, such as "Open Houses" or "Back-To-School Nights" or other situations, including "regular" school experiences, where groups of users traverse from one location (e.g., classroom) to another, where the users are parents or students and the "actors" are teachers or administrators. In this case a user colliding with a trigger would indicate a student or parent arriving at the classroom, and this may then indicate to the teacher that they should get ready to begin their lesson or other presentation. In the theatrical area, the patrons may traverse CG recreations of scenes of plays, musicals, or operas, and the actors may play out their scenes as the patrons arrive adjacent the action pockets or instantiation points associated with trigger areas.

Haptic Environments

The above generally discusses immersive environments from the standpoint of providing visual and audio presentations that appear to surround a user. The next step in immersion is considered by some to be the use of haptic technology, such as haptic vests or bodysuits, or portions of the same that fit particular portions of the body, e.g., haptic gloves or shoes, some of which are described in some detail above. Future implementations, generally considered far in the future, may include providing the sensation of smell and even eventually taste. However, it is generally believed that those, especially taste, will be well in the future.

Many of the problems of providing immersive environments from the standpoint of the five human senses are that one must adapt the provided sensory input to the sense, e.g., one must display something of appropriate size and character to the eyes, one must arrange the sounds appropriately for the ears, and in the case of smell and taste, one must actually (or at least generally) provide an appropriate chemical simulation that is appropriate for smelling or tasting by the user. In the distant future, it may be possible to bypass these sense organs and provide a feed directly into the nerves or into the brain. Until such time, any immersive environment must contend with the limitations of the physical senses.

In the case of the sense of touch, the skin organism is the largest organ in the body, and it is generally very complicated. The sense of touch incorporates multiple different subsenses, and thus replicating how an object feels is extremely complicated. This is despite the fact that touch is a relatively low bandwidth way of communicating. In contrast, a tremendous amount of data or information can be communicated visually or using audio compared to that which can be communicated by the sense of touch. And yet the sense of touch is key to a sense of immersion.

There are two subsenses that are employed in haptic technology: touch and kinesthesia. The former emerges using sensors in the skin called mechanoreceptors. The latter receives signals from sensors in joints, muscles, and so on, and these relate to movement and position of appendages, as well as muscle force.

A key distinction between visual or audio cues and data received from touch is that touch often involves an exploration of the object by, typically, a user's hand. In other words, there is a bidirectional nature of the data, in that a person must generally move their hand around an object to receive data about the same, and the data received is in part a function of how the hand is moving around the object. For example, in addition to moving one's hand around an object, a user can poke or prod an object to get an idea of its compliance, solidity, density, and so on. A benefit of such haptic technologies is that the same may be employed to allow alternate sources of data to impinge on a user, outside of the usual visual or audio stimuli, and thus provide load-balancing to the sight and hearing systems. The inventor has also recognized that a given user may feel an object in a particular way, in that the pattern of movement of the user's hand (or the light) may be reproduced whenever an object of like size and shape is encountered. For example, a user may feel an avocado for ripeness in the same way each time, or in roughly the same way. Such ways may be learned over time using machine learning and employed to reduce the latency in the future of such "feeling" endeavors. In other words, the system can learn how the user feels the avocado and then reduced the perceived or actual latency in the future when the user is feeling another avocado.

Currently, haptic technology is very limited. The prior art includes efforts at putting small vibrating motors in a suit or vest, or in a glove. While such can convey a certain level of signal, e.g., a vibration so as to simulate a touch, a bullet hit, and so on, the same are woefully lacking in providing the sorts of haptic systems needed for an actual sense of immersion to the user.

Thus, in one implementation according to present principles, systems and methods disclosed here provide improvements in haptic technology, both in terms of individual haptic technologies as well as ways in which different haptic technologies can be configured to work together.

Regarding sensing by the skin itself, there are various modalities, and these can be the subject of simulations, and in some cases the simulations are effective and in other cases the simulations are ineffective. These modalities include (in a nonlimiting list): touch, temperature, pain, and itch. In some cases the first two of these modalities can be easiest to simulate. Flexible electronics are known, and using such one can run signal and power wires to a multitude of motors or other sense-invoking devices that are placed along a flexible substrate, e.g., a haptic vest or bodysuit. In this context it should be noted that the motors can cause not only an individual vibration but also a specific touch—i.e., not just a generalized vibration but also just a single touch or indentation on the skin as well. These latter are termed herein "single effect" motors or (depending on context) "actuators". To push onto the skin, it is generally necessary to have the structure or housing (that holds the haptic devices) be close-fitting to the skin and to not deflect significantly once the motor is actuated. In other words, the housing should not deflect upon actuation of the motor such that the motor, or more correctly an end effector mechanically coupled to the motor, deflects away from the skin and reduces the effect of the contact of the end effector on the skin. In many cases, the amount of force applied is a function of the amount of deflection. See, e.g., FIG. 20. This is particularly true if the motor, which may be coupled to a structure or housing which may be included or formed as part of the haptic suit, deflects little or none upon activation of the end effector.

Temperature can also be simulated, such as via small resistive heaters that are separated by insulators (which in some cases can be the material of the flexible electronics). The small resistive heaters can be individually addressable just as the vibratory or single touch motors are. Where cooling is required, such may be provided via individual Peltier coolers or via a source of cold air run through channels to the locations required. In the case of individual Peltier coolers, an example of such coolers is provided by: HiLetgo 2pcs TEC1-12706 Semiconductor Refrigeration Tablets TEC1-12706 12V 6A Heatsink Thermoelectric Cooler Cooling Peltier Plate Module 40×40 MM.

Haptics generally involves the sense of touch, and biologically the same employ mechanoreceptors—tactile receptors—found all over the body, in both glabrous and hairy skin, and are in the epidermis and the underlying dermal layer. The mechanoreceptors in glabrous skin include various types, including: Meissner's corpuscles, Pacinian corpuscles, Merkel cells, and Paciniform endings. The above are distinguished based on: receptive field (size of area of skin that when stimulated produces activity in the fiber connected to the receptor, e.g., Type I: small, 2-8 mm in diameter, and Type II: large 10-100 mm in diameter. Generally small receptive field mechanoreceptors are concentrated in the fingertips and become progressively less numerous towards the wrist and forearm, and large receptive field mechanoreceptors are more sparsely distributed and do not show such a marked variation intensity on the hand. A high density of tactile receptors, such as at the fingertips, are much more sensitive to mechanical stimuli than areas with lower densities, like the palm. For example, in the fingertips, very small displacements (10 μm) and forces (10 mN) are perceptible. Another type of response is due to sustained indentation of the skin.

These responses in one aspect are distinguished based on the dynamics of their response, e.g., are distinguished based on the rate of adaptation. A first type is fast-adapting (FA)—these signal when skin is being indented but do not respond when movement of the skin stops, even if it remains indented. These are important in sensing very small movements of the skin, like when the skin initially contacts an object. Another type is Slow-adapting (SA)—these respond both while the skin is moving and during the period of sustained indentation. They are involved in perceiving shape, course textures, and the direction of motion of an object along the skin. Yet another type involves responses to vibrations. SA type I units are maximally sensitive to very low frequencies, e.g., between 0.4 and 3 Hz. FA type I units respond to frequencies between 1.5 and 100 Hz, while FA type II units respond to higher frequencies, between 35-1000 Hz.

Hairy skin usually has five types of mechanoreceptors (two of which are SA and three are FA), where the SA include Merkel cells and Ruffini endings and the FA include hair follicle receptors that innervate hairs, field units, and Pacinian corpuscles.

There are four recognized submodalities (cutaneous senses): touch, temperature, and pain. Pain is also referred to as nociception, and the receptors for these include receptors for hot or sharp, etc., as well as polymodal receptors for not only, e.g., sharp, but also chemicals like capsaicin. Itch is yet another, and the same can be triggered mechanically (coarse wool) or chemically (poison ivy or ok). Touch and temperature provide discriminative functions, e.g., used in finding keys or coins in a pocket. In an implementation according to present principles, these aspects are particularly important to replicate for an immersive virtual environment. However, pain may also be replicated as well, and the same could have a user-set level, e.g., from very low to high. Itch may also be replicated, in situations requiring exceptionally full immersion. Itch may be simulated or replicated by having a semi-rigid narrow rod (hair width, or somewhat larger) impinging on the skin. This could be caused or activated by an actuator as noted above. Alternatively, a series of actuators may be employed that cause a moving sensation to be applied to the skin, the moving sensation being relatively light in force but effectively causing an itch to the user. Pain might also be simulated using actuators with variable depth penetration. As noted, these may range from a low level of pain (small depth penetration) to a higher level of pain (higher depth penetration). Such actuators could simulate bullets, teeth (for zombie games), and so on. Shapes may include round for bullets, jaw-shaped for teeth, etc.

Tactile Virtual Reality

FIGS. 15-18 indicate systems in which touch and temperature may be simulated, using systems including end effectors 505 which may include vibratory motors 506, single effect motors or actuators 510 (in many cases vibratory motor V and actuator A can be embodied by the same device), heating elements 512, cooling elements 514, and air pressure contact points 508. These latter may include directed air (of a controlled temperature) onto the skin or otherwise directed for purposes of a user. But the same may also be conveniently employed to direct temperature-controlled air at a flexible bladder to allow an end (e.g., end effector) of the bladder to "move"—it moves because it is being inflated with air. The air inflation causes the desired movement against the skin, and the temperature of the air changes the temperature of the bladder surface, and more particularly the temperature of the bladder surface in contact with the skin of the user. In other words, deflection of the bladder may cause a desired movement of the end effector, and both bladder and end effector may end up contacting the skin.

In many implementations it will be sufficient to put the majority of the "heavy lifting" of the haptic effects on the hands via haptic gloves, whereas the remainder of the body can be subjected to more coarse haptic effects, such as haptic vibratory and single effect motors. Because of this the density of end effectors within a portion of a haptic suit, e.g., the haptic gloves, will generally be significantly greater than the density of end effectors in the rest of a haptic suit, e.g., the density in the chest, the density in the legs, the density in the feet, and so on. And the density of end effectors will also vary within the haptic gloves, from high density in the fingertips to lower density elsewhere. An example of the use of haptic shoes are as described above in connection with FIGS. 1 and 2.

Put another way, and referring to FIG. 15B, in a haptic suit, which can cover a portion of the body or a substantial entirety of the body, e.g., a bodysuit, a glove, a shoe, and so on, the grouping of end effectors (the totality of end effectors of a particular haptic type, e.g., heating, cooling, single effect or force, vibratory, and so on) may have a first local density $\rho_{cool}$ at a first haptic location 503 in the bodysuit, and the grouping of end effectors may have a second local density $\rho_{cool}'$ at a second haptic location 505 (excluding area 503), where the first local density is different from the second local density, and wherein the first haptic location is configured to contact skin of the user at a first user skin location, and the second haptic location is configured to contact skin of the user at a second user skin location, and where mechanoreceptors within the user's skin associated with the haptic effect have a different density at the first user skin location than at the second user skin location. As described elsewhere, and also as shown in FIG. 15B, within haptic location or area 503, the density of one type of end effector, e.g., cooling end effectors, may differ from that of another type of end effector, e.g., heating end effectors. In the figure, the cooling end effectors have a density approximately three times that of the heating end effectors. A typical range for these types of cooling end effectors may be, e.g., 2-5 times the number of heating end effectors.

Put yet another way, in other implementations, arrangements, and embodiments, and as indicated in FIG. 15B, a first grouping of one or more end effectors of a first type (only a portion of the grouping is shown, of first type "cooling", e.g., end effectors 514), the end effectors of the first type configured to deliver a haptic effect of a first type, the first grouping distributed in a predetermined pattern on the body wearable suit; and a second grouping of one or more end effectors of a second type (only a portion of the grouping is shown, of second type "heating", e.g., end effectors 512), the end effectors of the second type configured to deliver a haptic effect of a second type, the second grouping distributed in a predetermined pattern on the body wearable suit, where at a particular location on the body-wearable suit, an areal density of the end effectors of the first type is different from an areal density of the end effectors of the second type. When the term "density" is used above, it may refer to a point density, e.g., an areal density, or other types of calculations indicating how many of a particular type of end effector occupy a particular areal or volumetric extent.

Examples of flexible electronics include those discussed at https://en.wikipedia.org/wiki/Flexible_electronics. Other aspects of flexible circuits may be seen at, e.g., https://www.youtube.com/watch?v=OYVU9Ha_rHs.

Figure 19:
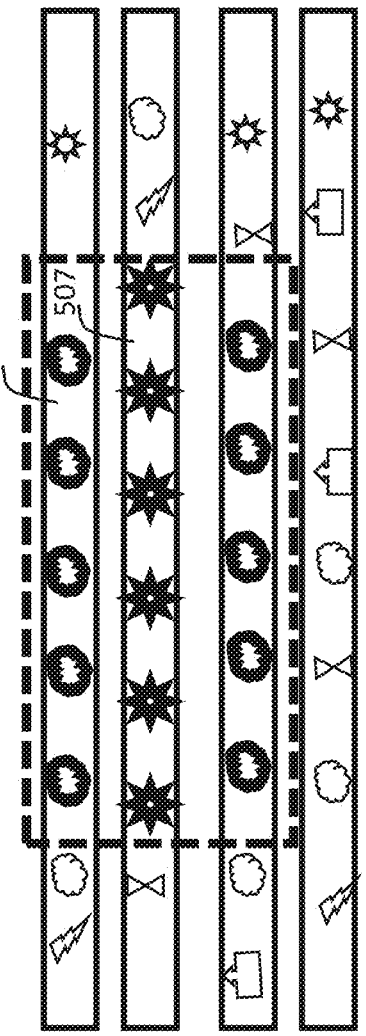
FIG. 19 illustrates one way to simulate pain in a haptic suit.
Figure 20:
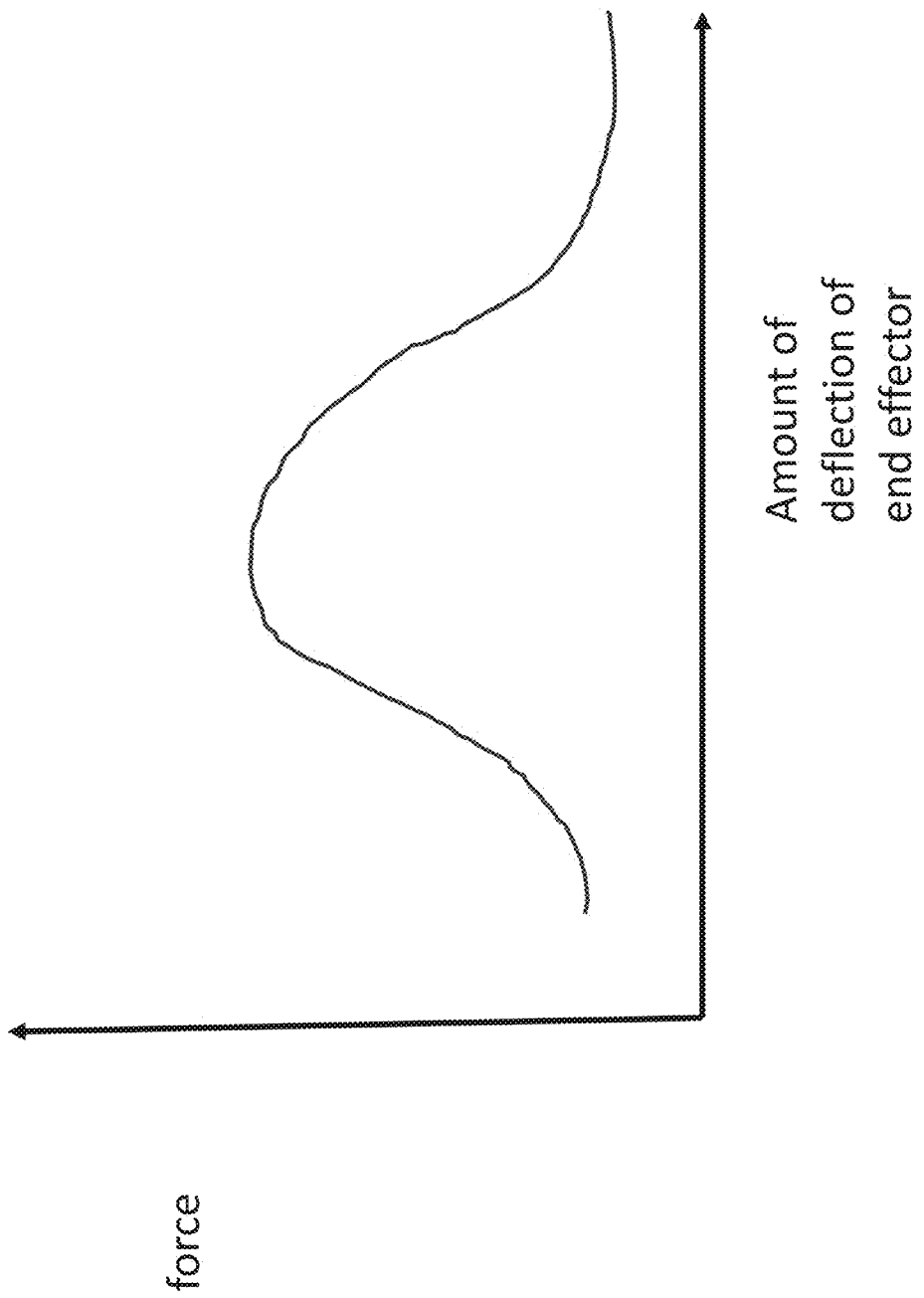
FIG. 20 illustrates an exemplary graph showing force applied as a function of an amount of deflection of an end effector.

It will be noted that while exemplary systems have been disclosed above for providing mechanical effects on the skin, as well as temperature effects, and to a certain extent pain effects, other techniques may be employed to specifically address pain and itch. The tactile sensation of pain can be addressed by alternating hot 507 (e.g., a line of end effectors 512) and cold 509 (e.g., a line of end effectors 514) lines in a particular area. In particular, as illustrated in FIG. 19, creating a cold line (adjacent a hot line and repeating this arrangement across the area over which the pain is desired or indicated to be simulated causes a haptic illusion of pain. While the actual mechanism is unclear, it is believed to cause an annoying feeling on the skin which is interpreted by the brain as pain. An electric shock can also be employed as a proxy for pain, and of course also for a shocking sensation.

As noted above though, the density of receptors in the skin varies according to the part of the body, and for most efficient processing of an immersive environment, it is desirable to focus processing load on areas with a high density of receptors. This is not to say that other areas of the body are not affected, it is just that relatively more end effectors may be actuated or otherwise caused to drive their effects in areas with a relatively high density of receptors as compared to areas with a relatively low density of receptors. This being said, variations will be understood according to the type of receptors. In other words, a relatively high density of one type of receptor may be in the same area as a relatively low density of another type of receptor, and this may then be reflected in the respective density of end effectors.

Densities of Types of End Effectors

Generally speaking:

$$\beta = \Sigma_{i=1}^{N}[\rho(i)_{LEE} + \rho(i)_{HEE} + \rho(i)_{CEE}]$$

Figure 18:
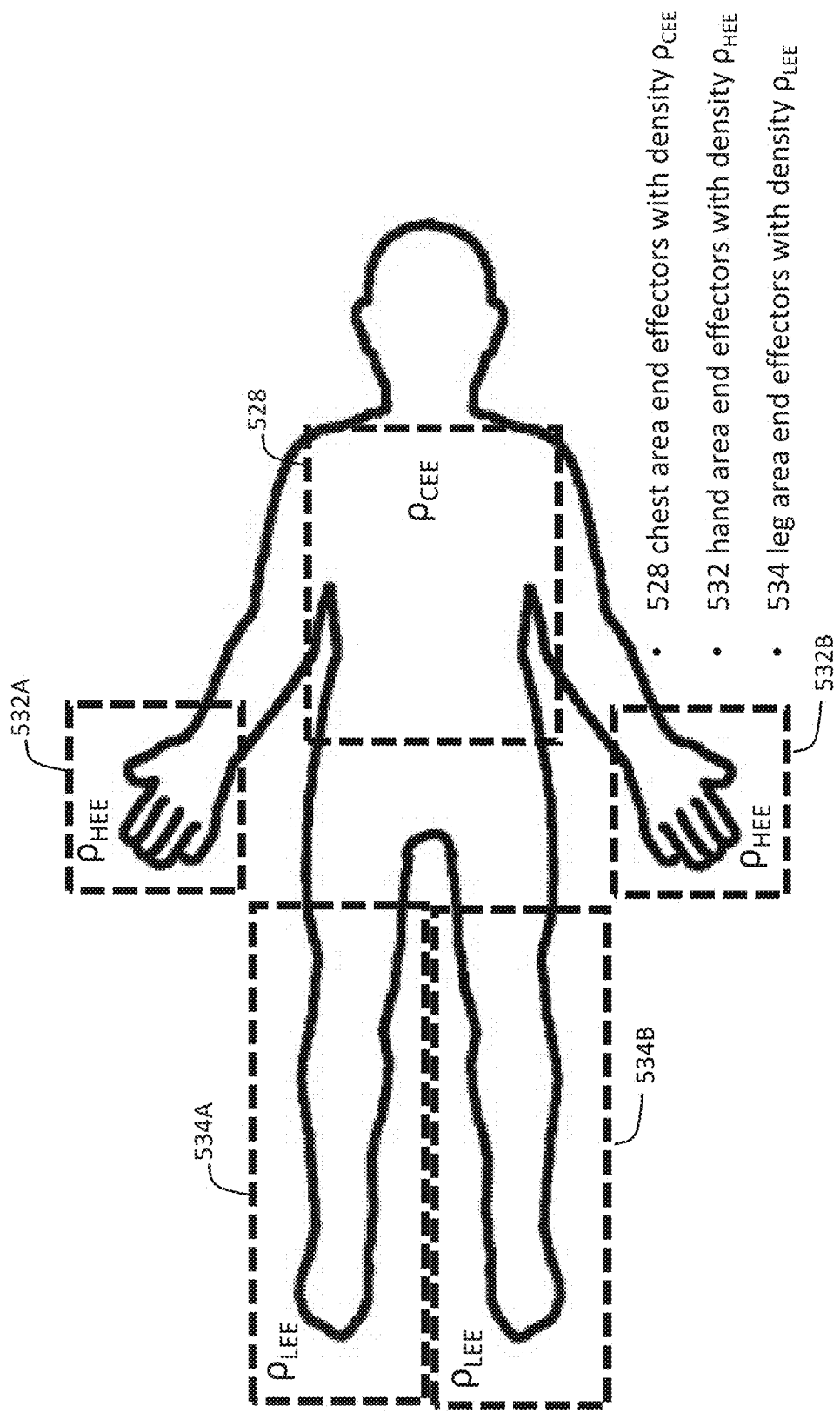
FIG. 18 illustrates various portions of a bodysuit, and densities of end effectors therein.

And in the specific case of FIGS. 15 and 18:

$$\rho_{LEE} = \Sigma[\rho_{LEE(V)} + \rho_{LEE(P)} + \rho_{LEE(A)} + \rho_{LEE(H)} + \rho_{LEE(C)}]$$

with similar statements for $\rho_{LEE}$ and $\rho_{HEE}$.

As may be seen in FIG. 18, $\rho_{LEE}$ corresponds to the density in the leg, $\rho_{HEE}$ corresponds to the density in the hand, and $\rho_{CEE}$ corresponds to the density in the chest. The letters in parentheses indicate the type of end effector, as defined in FIG. 15.

The various end effectors may each be distributed over the entirety of the suit according to predetermined patterns, according to how the mechanoreceptors of the body are generally distributed in a population basis. As the distribution of mechanoreceptors varies by type, so may the predetermined pattern for each type of haptic effect, and the corresponding density of haptic end effectors.

These different densities do not just correspond to where a higher or lower density of end effectors are needed, but also correspond to where mechanoreceptors have a higher or lower density over the body. In addition, these receptors either have a small receptive field (type I, 2-8 mm in diameter) or a large receptive field (type II, 10-100 mm in diameter). In addition, another way of characterizing mechanoreceptors is based on their dynamic response, i.e., their rate of adaptation. Fast adapting receptors signal when skin is touched but not when the touch stops. Slow adapting mechanoreceptors respond when the skin is touched (moving) as well as during the time when it is indented.

However, this increase in the density of mechanoreceptors does not hold true for other types of receptors, e.g., thermoreceptors. In particular, while the fingertips have a higher density of mechanoreceptors than many other areas of the body, this is not true of thermoreceptors, as the area of the back of the hand is generally more sensitive to changes in temperature than the fingertips. Therefore, spatial and temporal resolution are important to consider for haptic systems because it is desirable to avoid wasting end effector density to achieve higher resolutions than that detectable on the skin. The below Table II indicates examples of such resolutions, and thus which resolutions are desirable from a standpoint of being a general maximum.

equal weight, but disposed at different temperatures, the cold item is detected as being heavier than the warmer item. In some cases, a perception of an entire order of magnitude can be caused. This thus indicates one way in which haptics may be employed to indicate different weights: via the use of different temperature in the end effectors while portraying or rendering to the user a CG object, e.g., either in different hands or in the same hand at different times. It is generally much easier to change the temperature of a (perceived) object than it is to actually change the mass situated within or attached to a haptic glove. Accordingly, by lowering the temperature using, e.g., the aforementioned Peltier coolers, an increase in weight of a virtual object can be simulated.

But the amount of temperature lowering should not be such that the object appears too much colder—in this case the effect of lowering temperature should be to trick the brain into thinking the object is heavier, not noticeably colder. So to make an object appear heavier, cool the fingertips that are "grasping" the virtual object by 1° F., 2° F., 5° F., 10° F., 20° F., 25° F., 50° F., or as dictated by the requirements of the designer, but it is noted that too much more will lose the effect—the user will just perceive the object as colder.

It is noted that the above effect generally relates to situations in which both objects are cooler than skin temperature, but one is warmer than the other. In some cases, warming an object above skin temperature can also cause

TABLE II

| Body Portion | Spatial Resolution (closest in space distance between two points that can be perceived as two points) | Temporal Resolution (closest in time duration between two contacts that can be perceived as two sequential points and not simultaneous points) | Comments |
| --- | --- | --- | --- |
| Fingertips | 1 mm | 5 ms | Corresponding to spatial resolution, a spatial acuity may be achieved of about 0.2 mm (a bump on the skin of about 0.2 mm can be perceived with no relative movement). With movement, a bump of 13 nm can be perceived. |

Other spatial acuity measures include the smallest groove or ridge width at which the orientation is perceived; in fingertips this is about 1 mm. Another concept is the "just noticeable difference" (JND) or Weber fraction, which is the difference in weight needed for a user to perceive the weights as being different. This has been measured to be about 6%, and thus, if two objects are intended to be, in a virtual world, of different weights, the difference in force applied will generally need to be greater than 6%.

Specific Examples of Implementations

The following are certain aspects that can be employed to assist in providing haptic immersion in a way in which one aspect or feature is leveraged for multiple effects, such providing for efficient construction of a haptic device which meets the requirement of being low weight (low mass) but still having sufficient sub devices (or assemblies of sub devices) within to accommodate multiple effects.

Temperature and Weight

Temperature cues can be employed to identify objects, e.g., if one is searching for keys in one's pocket, metal keys will appear to be at lower temperatures than say, e.g., a plastic comb, because of the difference in heat capacity, and thus can be identified or "standout". Interestingly, if two objects are provided to a person, the two objects having the object to feel heavier, but this effect is much smaller and varies from person to person.

It is also noted that generally skin temperature is warmer than (at least room temperature) objects that users typically touch, and thus it is the flow of heat from a user's hands to an object that determines the temperature at which the object is perceived. A very highly thermally conductive material like a metal will feel colder than a low thermal conductivity materials such as rubber.

Weight and Size/Volume

Another illusion is if two objects have the same weight but different volumes, the larger object is detected to weigh less than the smaller one. Thus, if in a virtual environment, a user is embodied by an avatar with outstretched hands, and a large virtual object is in one hand, and a small virtual object is in the other, all other things being equal, the larger object will be perceived to weigh, counterintuitively, less than the smaller virtual object. In this case, it is noted that, "all other things being equal" include that the weight of the haptic gloves are presumed to be the same, and thus it is indeed the situation that the actual weights are equal. But again, if the scenario is that a virtual object is in each hand, the larger object, e.g., that which causes the user's fingers to have to spread wider to hold, will be perceived to weigh less. This can be employed in a haptic illusion. If the weight of an object is intended to go down, e.g., a user is pouring lemonade from a pitcher, an increase in the size of the pitcher, e.g., 2% to 5%, may be employed to enhance the illusion, particularly if the size increase is small enough to be detectable at a subconscious level but not obvious at a casual viewing.

Weight and Shape

This is a general illusion, in that objects that appear to be the smallest are often considered to the haptic senses to be heaviest. In other words, in some cases, density can be employed as a proxy for mass, in an inverse relationship. In addition, surface texture plays a role, as objects that are slippery tend to be considered or perceived as heavier than those with rougher surfaces, potentially because the latter are perceived to be easier to grab.

TABLE III (two or more objects, each having the same mass)

| Property | Result |
|---|---|
| Volume | Large objects perceived tactically to be lighter than small objects |
| Shape | Cubes are lighter than spheres |
| Density | Metal is lighter than wood |
| Temperature | Cold objects haptically heavier than warmer objects, or objects at room temperature |
| Surface texture | Objects with rough textures lighter than objects with smooth textures |

Visual Illusions With Haptic Analogs

Muller-Lyer illusions may be employed where lines bounded by arrowheads are perceived as shorter than lines bounded by fins. In the same way, horizontal-vertical illusions may be employed, where the length of a vertical segment is overestimated by about 1.2 times relative to a horizontal segment of the same length. These illusions may be employed to allow objects having the same length to appear to have different lengths depending on its orientation or upon decorations it is adorned with. This not only allows objects to be reused for different purposes, but also allows the same object (virtual) to be used for different haptic effects.

Exertion/Sweating in a Virtual World while Holding/Manipulating an Object

If a user avatar is "sweating" in the virtual world due to exertion, the papillary ridges (fingerprints) would swell in real life, providing better anti-slip mechanisms and grasp stability, and such may be replicated in the virtual world as the avatar holds objects. For this and for other purposes described herein, a monitor module may be employed in the game engine to determine these aspects of when a user character, often embodied by an avatar but not always, is present in a situation in which a haptic effect is desirable. For example, following exertion that is beyond a threshold considered to lead to a degree of sweating (e.g., if the avatar has "run" for a period of over 15 seconds, 30 seconds, one minute, and so on, or, if the avatar is in a stressful situation, e.g., in a battle), if the avatar is holding an object, the object can be configured to be, from the sense of haptics, more stable in the avatar's hands (assuming they are holding the object at the fingertips) than if the avatar were not sweating in the virtual world, because of the effect of the (virtual) sweat on the ability to grip.

Holding and Manipulating an Object

Holding an object—manipulating an object and perceiving fine spatial features depends on SA type I (SA I) receptors that have a high sensitivity to temporal and spatial aspects. In contrast, FA I receptors respond when there is movement between the skin and the object, e.g., for detecting slip.

Wetness and Humidity

Human hands can detect wetness and humidity in several ways, using temperature information, as wetness tends to conduct heat, pressure, as there is a pressure differential at an interface between liquid and air, as well as in the stickiness of the material. However, the fingers generally have to be able to move across the fabric to detect significant degrees of wetness or stickiness in textiles, as compared to when the fingers are resting passively on a surface.

Tau Effect

In this effect, if the time interval between stimuli on the skin is very short, they are perceived to be closer together spatially than they are in reality. This effect may be employed to distort the space of the virtual world as perceived by the user so as to accomplish various desired effects.

One example of a use of such effects is where in the virtual world the movement of a feature is perceived to be large visually, when in fact haptically the feature only moved a small amount. Such may be conveniently employed when hand or finger movements are desired to cause a change in size or position, but this change in size or position is significantly out of proportion to that corresponding to the distance the fingers or hand are allowed to move in their haptic system (e.g., how far the fingers of the gloves are allowed to move).

Similarly, pseudo-haptic feedback may be employed to simulate haptic properties by simulating haptic feedback by combining visual feedback in a synchronized way with the individual's movements or actions in the virtual environment, but distorting the visual feedback so as to create the haptic illusion. Such may be employed to, e.g., slow down perceived object movement so as to simulate friction, and so on. This may be employed to, e.g., simulate a user feeling cloth having both damp/wet and dry sections by simulating more rapid movement across the cloth for dry sections and slower movement (due to friction) across the damp or wet sections.

Velocity of Stimulation and Perception of Distance

In a related effect that may be advantageously employed according to present principles, if a continuous tactile stimulus is applied to the skin, and users are requested to judge the distance traveled, the judged distance is strongly influenced by the velocity that the probe moves across the skin: faster velocities implies shorter distances. It is noted in this regard that the distance between two points of stimulation is greater in areas with higher spatial acuity, like the hand or face, as opposed to those with lower acuity, such as the leg or forearm. This is referred to as Weber's Illusion. Such may be employed to various effects as well, including accommodating larger ranges of movement within the confines of the user's fixed body size, by causing the actuating force to travel down the skin at a slower velocity than might otherwise be employed. It is noted that in a haptic suit, generally there is no one force actuator that is actually or physically traveling down the length of the skin. However, this illusion can be created by having multiple force actuators actuate in a sequence so as to cause the illusion of traveling down the skin at the desired speed. This has the effect of making the user think it is just a single force actuator, as the human mind is particularly adept at "filling in the holes" between force actuators, and making the motion seem continuous. This effect is known as the phi phenomenon. This can even be employed when certain actuators in the sequence are skipped, either for battery preservation or otherwise, as again human senses and the brain tends to "fill in" such gaps.

Sensory Funneling

In this effect, tactile stimuli may be perceived at locations in which there is no stimulation. In particular, when short tactile stimuli are caused simultaneously at closely spaced locations on the skin, they are often perceived as occurring at only a single focal point in the center of the stimuli.

Sensory Saltation

In this effect, a series of short tactile pulses are delivered successively at multiple locations on the skin. The effect is that the user perceives the stimulus that is moving progressively across the skin. There is a limit to the effect, in that if the time interval between taps is 300 ms or more, then the user accurately localizes where the taps are, and there is no illusion of a continuous hopping. It is noted in this regard that the user perceives more stimuli than are actually present. Not only can this be used for the accomplishment of presenting virtual reality, by causing, using end effectors, a series of taps to occur where the time duration between taps is less than 300 ms, but it further shows that perception of both real and illusory stimulation are practically indistinguishable. The effect can be particularly pronounced where the sequential taps are relatively close together, e.g., caused by adjacent end effectors.

Rubber Hand Illusion

In this powerful illusion, tactile sensations experienced on a user's unseen hand are attributed to a visible artificial hand, as if what they are seeing was actually the subject of the tactile stimulation. In this illusion, users are shown a rubber hand being stroked with a brush while their own unseen hand is simultaneously being stroked. Users often report that they feel the touch of the brush on the rubber hand and not on their unseen hand. This powerful illusion can be employed in virtual worlds, where what the user sees is a CG version of their own hand, which can be strikingly realistic, but an effect can be provided via stimulation on their (unseen) hand, but attributed to the CG hand.

Haptic Vibration Illusion

In this illusion, limb movements can be simulated by applying vibration to the skin overlying a tendon. When this occurs, the limb can be believed to have been moved, even if no movement has actually happened. For example, if a biceps tendon is vibrated, users may perceive that their forearm is extending. Of course, it will generally be necessary for the arm to be hidden from view and restrained so that it cannot move, so as not to break the illusion. This effect may be employed in a virtual world in an even stronger capacity, as the limb can be illusorily moved by the vibration of the skin atop a corresponding tension, and at the same time the virtual world can have the avatar move that same limb. Moreover the use of virtual reality goggles effectively obscures the user from viewing their actual limb, enhancing the effect. This can be particularly employed, for example, in kinesthetic virtual reality, as the limb can also be caused to appear to stop moving when the avatar limb stops moving. Such may be advantageously employed in, e.g., interactions with other avatars, e.g., causing handshakes and having the same feel to the user to have happened, and so on.

Exploring an Object

As noted above, a key aspect of haptic sensing, as opposed to vision or audition, is that a user has to "feel" an object to perceive data about it, and this "feeling" generally involves moving a finger or the hand (or a part of the hand) across the surface of the object, as well as picking, probing, or poking the object, so as to determine its compliance.

It is expected that a user will do this in virtual reality as well. Thus, one aspect according to present principles is that as an object is manipulated in the hand, i.e., as a CG object is manipulated in a virtual world by an avatar's hand, not just static (as in the prior art) but dynamic and changing forces must be imparted to the user using the end effectors so as to allow the user to acquire the desired data from the object, e.g., ripeness of fruit, e.g., the avocado mentioned above, level of inflation of a ball, and so on.

Figure 21:
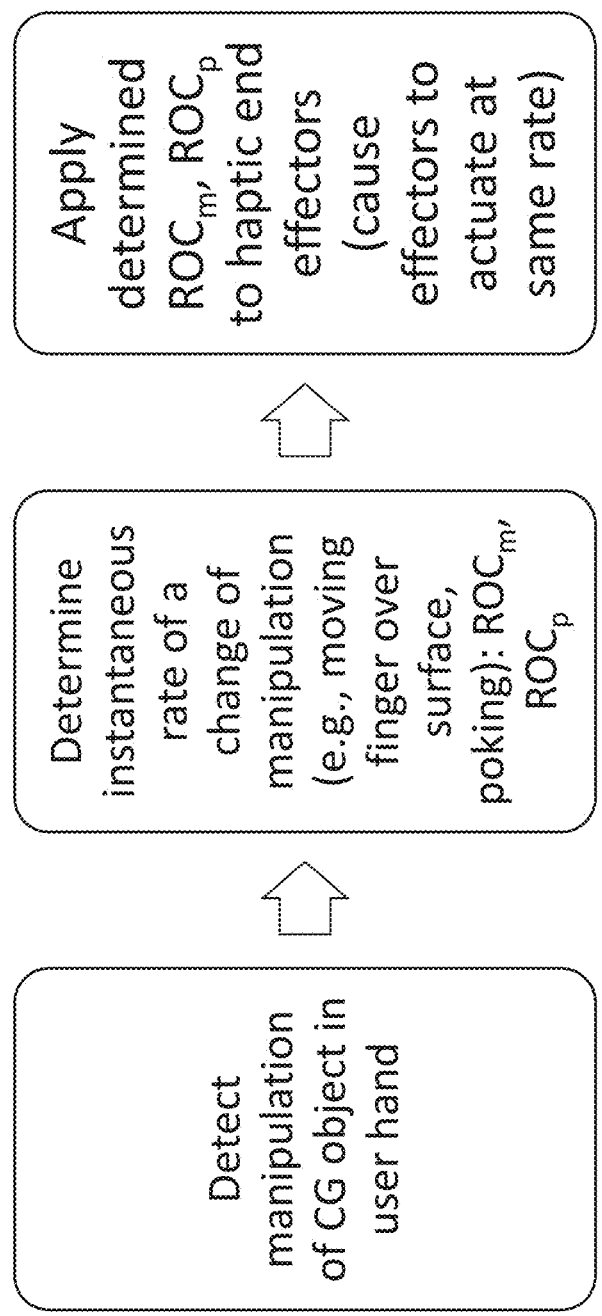
FIG. 21 is a flowchart indicating ways to create a dynamic effect as a user is moving their hands around a virtual object. It will be understood that, to do so, one hand may need to at least partially support the object as the other moves around it, or alternatively one part of the hand, i.e., one set of fingers, may hold the object, while fingers not in the set are moving around the object to detect texture, compliance, and so on. In yet another implementation the object may be partially tossed or juggled so as to rotate the same while being generally contained within the user's hand.

FIG. 21 indicates an exemplary flowchart of a method of operating haptics according to the above situation, which may be employed, e.g., for a haptic glove. In particular, if a virtual object is being manipulated in an avatar hand—e.g., the same can be detected by the object being adjacent the avatar hand (by comparison of collider positions) and by the object having some relative movement compared to the avatar hand, where the movement is either relative positioning of its surface or change of shape due to the avatar hand poking the object and the object having a degree of compliance.

A rate of change can be determined by a numerical analysis of how the geometry is changing with time, e.g., how fast the portion of the hand is moving over the surface or how fast the shape of the object is changing, e.g., being indented. This determined rate of change or time derivative can then be applied back to the user's hand by way of the haptic end effectors. In particular, the rate of change so determined can be applied back to a haptic glove in such a way that the end effectors that are being actuated are being actuated at the same rate of change determined in the prior step. In this way, a dynamic arrangement is made, rather than a static one, significantly increasing immersion for the user. Such may be particularly important if the user is holding onto an object such as a drinking glass or the like, because dynamic and extremely rapid feedback is necessary if the user adjusts their hold on the object, e.g., glass, so that the user does not drop the glass.

It is further noted in this regard that the above discussion of fast adapting and slow adapting mechanoreceptors may be applied here, and in particular, to the extent sensors are employed that mimic slow adapting mechanoreceptors, these may be advantageously used in these types of rate of change calculations over the fast adapting ones, because the skin has in many cases (but not always) already contacted the object.

To provide even better anticipation of how a user "feels" a CG object, and thus to provide even more rapid haptic feedback (and change in haptic feedback), machine learning may be employed to learn how a user typically feels an object. In the same way, population data may be employed to the extent that users "feel" an object in the same way. In some cases a combination of population data and machine learning data or personalization data can be employed. For example, population data may be employed initially, but as the system learns how user feels objects, as noted above with respect to the user "feeling" a virtual avocado, the same may be employed to personalize the anticipation, i.e., the system knows for a given object, or has learned for particular user, what portions of the object the user is likely to touch in an exploratory feel of the object. This position or direction data, combined with the detected speed data may be employed to provide the subsequent haptic feedback for the next differential area of the object to be explored, such that the user does not need to wait or have a delay or other sort of latency. This significantly increases immersion for the user.

The interaction or manipulation can in some cases be more complex, e.g., a finger will not generally smoothly go exactly according to the surface of an object. There is skipping, either because of the compliance of the finger or the object, or because of the effect of the papillary ridges (fingerprints). Thus, in a highly immersive environment, the effects of these "skips" or areas of no contact may be simulated and made part of the haptic experience. Vibrations are also caused by these papillary ridges, particularly when fingertips rub together, causing two sets of papillary ridges to slide one relative to the other. In a haptic glove this would not be possible, because presumably each finger is in its own finger sleeve, and while papillary ridges may cause a vibration as the finger tip moves somewhat within the glove, there is no physical way to cause contact between the papillary ridges on two fingers. However, where in the CG space or virtual world the fingertips are detected as being rubbed together, i.e., the fingertips of an avatar, an extra level of vibration may be employed to simulate this rubbing together.

It is further noted that while examples have been given above of a finger moving around an object, to perceive its properties in geometry, in some cases, particularly for smaller objects, the entirety of the object can fit in the user's hand, and it may not be necessary to rotate the object or move the fingers relative to the surface of the object. However, local movements can be made, where the hand stays in one position and a portion of the finger moves around the object, or moves instead of the object, so as to allow the necessary exploration. For larger objects, the same generally requires sequential exploration by the hand to determine shape and material properties.

Examples of material properties which may be detected include those corresponding to surface texture, which can be broken down into roughness, stickiness, slipperiness, and friction. Generally, these can be categorized according to various axes or dimensions, i.e., roughness/smoothness, hardness/softness, and stickiness/slipperiness. In many cases the roughness/smoothness axis corresponds to how far apart elements comprising the surface are, particularly with regard to more course textures. What users can typically perceive as a difference in compliance is fairly course, e.g., the differential threshold is around 22%, which is much larger than the 6% described for weight and force. A distinction may be made between objects that are themselves compliant, e.g., a balloon, versus a rigid surface which can move, e.g., a foot pedal in a car. For the former, tactile cues may be sufficient for determining compliance. For the latter, both tactile and kinesthetic cues must be employed. Viscosity is another important feature which is the ratio of force to velocity. These may be particularly important in simulations involving liquids, e.g., cooking simulations, as sauces in the required discrimination in changes in viscosity.

There is a preferred speed of exploratory movement which is believed to optimize data going to the brain. Users may involuntarily use this range of velocities in real life. The system may assume velocities are in this range so as to provide more efficient processing, as the velocity need not be developed from scratch. This range of velocities of movement across the skin is about 50 to 200 mm/s.

Kinesthetic Virtual Reality

Kinesthetic virtual reality deals with the part of haptics regarding sensing muscle position and movement, and when combined with the tactile virtual reality devices described above, provide a complete haptic solution.

Kinesthetic information comes from sensory receptors in muscles, called muscle spindles, and the same are actuated by limb movements and positions as caused by muscles, tendons, and joints. These would be implicated in haptic systems in which the immersion causes movement of the limbs, e.g., the feeling of a wind, a handshake, and so on, as may be caused within a virtual world.

Limb movements are perceived using muscle spindle receptors, cutaneous mechanoreceptors, and joint receptors. Limb position is perceived using generally the same types of receptors. Forces are perceived using Golgi tendon organs and corollary discharges.

The density of muscle receptors for the kinesthetic system is much less than the density of mechanoreceptors for the tactile system. There are about 4000 muscle receptors in each arm, and about 25,000 to 30,000 in total. Higher muscle spindle densities are found within the hand, and the highest densities are found in neck muscles.

Design of Haptic Systems for Virtual Reality

At least in part due to the large number of factors in haptic processing, simplification of the processing is desired and warranted, in the design of an actual haptic bodysuit. Of course, it will be understood that body contact can only be accomplished where a suit is adjacent that skin, unless the haptic action takes place at a distance, using, e.g., ultrasonics/sounds waves. Such systems are described at, e.g., https://www.youtube.com/watch?v=6IhQnWb44zk&list=WL%index=31.

For full-body immersion, a haptic suit would generally cover the entire body, and the hands would be encased in haptic gloves, and the feet may be encased in haptic shoes. For locomotion, i.e., for realistic locomotion by walking, a multidirectional or omnidirectional treadmill may be employed if the user desires to physically walk, or a system similar to that of FIGS. 1 and 2 may be employed, if the user desires to virtually walk. A VR or AR headset would be worn, for vision and audition. Typically a VR headset would be preferred for this purpose. Such are currently fairly bulky, but as the same go down in size and weight, room may be afforded on the head for a haptic head covering, e.g., a haptic balaclava or HB.

The bodysuit may be provided with a greater density of tactile force actuators on the glabrous skin, e.g., the fingertips, and the density of such may generally decrease by a gradient going towards the wrist and forearm.

For thermal actuators, the same may be by way of resistive heaters, Peltier coolers, forced air (see, e.g., https://www.youtube.com/watch?v=oXcwp8g35pQ&list=WL&index=3), and so on. The density of these can vary as well. For example, for causing cold temperatures, the density can be greatest in the lip area, going to a medium density in the finger, and decreasing to a minimum density in broad areas of the trunk. Generally, as the body is more sensitive to cold then to heat, it is desired to have more cold actuators than warm actuators. In more detail, as there are 3 to 10 times as many cold sensitive points, it may be desired to have 3 to 10 times as many cold actuators as warm actuators. As an example, the number of cold actuators in the finger may be 3 to 5 times as many as in the broad areas of the trunk.

To accomplish kinesthetic virtual reality along with the tactile virtual reality, devices such as exoskeletons may be employed to provide a structure around the user so as to accomplish force generation such that the user can simulate picking up objects, and so on. Of course, to eliminate fatigue, such should be low mass. Besides eliminating fatigue, low mass can allow the entirety or majority of the haptic forces, including opposition forces, to be exerted by the exoskeleton or other system, e.g., electromagnetic force generating system, so that the same is accurate and reproducible.

In a particular implementation, systems and methods according to present principles relate to providing haptics effects for users experiencing a virtual environment, including: monitoring data about a character and an associated environment within a virtual environment; from the monitoring data, determining if a haptic effect should be delivered to a user based on an event within the associated environment, the event associated with the character, the user controlling at least one aspect of the character in the virtual environment; and if the determining is that a haptic effect should be delivered to the user, then causing the haptic effect to be delivered to the user by transmitting one or more signals to a set of end effectors associated with the haptic effect, the set being a subset of a grouping of end effectors, the set of end effectors affecting one or more senses of the user, wherein the grouping of end effectors has a first local density at a first haptic location, and the grouping of end effectors has a second local density at a second haptic location, wherein the first local density is different from the second local density, and wherein the first haptic location is configured to contact skin of the user at a first user skin location, and the second haptic location is configured to contact skin of the user at a second user skin location, and wherein mechanoreceptors within the user's skin associated with the haptic effect have a different density at the first user skin location than at the second user skin location.

In particular implementations, one or more of the following variations may be employed. The monitoring data may include monitoring data from a game engine. The haptic effect may be is selected from the group consisting of: a mechanical effect, an air effect, a chemical effect, or a thermal effect, or combinations thereof. Where the haptic effect is a thermal effect, one or more of the set of end effectors may cause capsaicin to contact skin of the user at a skin location associated with the set of end effectors. In another alternative, or which may be used in combination with other effects, where the haptic effect is a pain effect, and the set of end effectors may include alternating heating and cooling elements, and the pain effect is caused at skin of a user by simultaneously actuating the alternating heating and cooling elements.

It is noted that where a particular embodiment is described as a method, in many cases the same embodiment may be implemented as a system either with means to perform the various steps or with particular structural components, described elsewhere, that can perform the various steps or be configured to do the same. Similarly, where an embodiment is described as a method, the same may often employ a non-transitory computer readable medium comprising instructions which cause a computing environment to perform the steps of the method. Similarly, where an embodiment is described as a system, such a system may be configured to perform various steps as a method, and again the method may be performed by steps described by instructions on a non-transitory computer readable medium. As will also be understood, the various embodiments described here with respect to different types of haptic effects and end effectors may be combined in various ways.

In yet another particular implementation, a system for providing haptics effects for users experiencing a virtual environment may include: a body-wearable suit configured to cover a portion of a user's body; a first grouping of one or more end effectors of a first type, the end effectors of the first type configured to deliver a haptic effect of a first type, the first grouping distributed in a predetermined pattern on the body wearable suit; and a second grouping of one or more end effectors of a second type, the end effectors of the second type configured to deliver a haptic effect of a second type, the second grouping distributed in a predetermined pattern on the body wearable suit, wherein at a particular location on the body-wearable suit, an areal density of the end effectors of the first type is different from an areal density of the end effectors of the second type.

Implementations of the above embodiments may include one or more of the following aspects. The body-wearable suit may be configured to fit a user's hand or leg or entire body. The predetermined pattern of the first grouping may be based on an expected distribution of mechanoreceptors associated with the haptic effect of the first type, and the predetermined pattern of the second grouping may be based on an expected distribution of mechanoreceptors associated with the haptic effect of the second type.

The body-wearable suit may be configured to be in signal communication with a processor, the processor configured to monitor data about a character and an associated environment within a virtual environment, and from the monitored data, the processor is configured to determine if a haptic effect should be delivered to a user based on an event within the associated environment, the event associated with the character, the user controlling at least one aspect of the character in the virtual environment, and if the determination is to deliver the haptic effect, the processor is configured to provide one or more signals to a first set of end effectors of the first type, or to provide one or more signals to a second set of end effectors of the second type, or both, the signals causing the haptic effect to be delivered to the user.

In this regard it is noted that the term "virtual environment" is used to refer to the overall environment, while the "associated environment" is used to refer to the part of the virtual environment that is local to the character, e.g., the character controlled by the user. The associated environment may be thought of as the portion of the virtual environment that can have an effect on the character and thus a haptic effect on the user.

The monitored data may be from a game engine. The haptic effect of the first type and the haptic effect of the second type may each be selected from the group consisting of: a mechanical effect, an air effect, a chemical effect, or a thermal effect, or combinations thereof. The haptic effect may be a thermal effect, and in this case one or more of the end effectors may be configured to cause capsaicin to contact skin of the user at a skin location associated with the set of end effectors. Where multiple haptic effects are enabled, a first haptic effect may include the thermal effect of heating and may be caused by heating end effectors, a second haptic effect may include the thermal effect of cooling and may be caused by cooling end effectors, and at one or more locations in the haptic bodysuit the density of cooling end effectors is two to five times the density of heating end effectors. The haptic effect may be a pain effect, and the set of end effectors may include alternating heating and cooling elements, and the pain effect may be caused at skin of a user by simultaneously activating or actuating the alternating heating and cooling elements.

In yet another implementation in virtual or augmented reality, systems and methods according to present principles may provide haptics effects for users experiencing a virtual environment, including: monitoring data about a character and an associated environment within a virtual environment; from the monitoring data, determining if a haptic effect should be delivered to a user based on an event within the associated environment, the event associated with the character, the user controlling at least one aspect of the character in the virtual environment; if the determining is that a haptic effect should be delivered to the user, then determining if the haptic effect is available, and if the haptic effect is available, then causing the haptic effect to be delivered to the user by transmitting one or more signals to a set of end effectors associated with the haptic effect, the set being a subset of a grouping of end effectors, the set of end effectors affecting one or more senses of the user; and if the determining is that a haptic effect should be delivered to the user but the determining is that the haptic effect is unavailable, then determining if a substitute haptic effect is available, and if the substitute haptic effect is available, then causing the substitute haptic effect to be delivered to the user by transmitting one or more signals to a set of end effectors associated with the substitute haptic effect, the set being a subset of a grouping of end effectors, the set of end effectors affecting one or more senses of the user, and further modifying the associated environment or the virtual environment to indicate a visual feature associated with the substitute haptic effect.

Implementations of the above embodiments may include one or more of the following aspects. The monitoring data includes monitoring data from a game engine. In a particular example, the event may be a user's character touching (or being about to touch) a soft surface within the associated environment, the determining step may include determining that the haptic effect is unavailable, e.g., by determining that a haptic effect of touching a soft surface is unavailable, and in this case the substitute haptic effect may be the haptic effect of touching a hard surface, and modifying the associated environment or the virtual environment to thus include visually rendering a hard surface in place of the soft surface. In this way the user or player both sees and feels a hard surface, which is available, rather than seeing a soft surface but feeling a hard one, leading to a visual incongruity.

Haptic Rendering

Haptic rendering refers to the process of calculating forces and other aspects that are delivered to the end effector is to cause the desired haptic effect. For example, in a CG system, surrounding colliders can be tested to determine if they are in the same area of space as a subject avatar, exert an effect haptic on the user's haptic bodysuit. Similarly, besides testing for location, compliance may further be tested. Such is generally a factor of the subject avatar as well as the CG model of that with which they are colliding. Furthermore, various virtual temperature sensors may be placed in locations around the subject avatar, in the same may accept inputs from other CG objects in the scene. For example, a campfire may be a source of heat, as may be the sun. Settings within the scene may describe the temperature of the environment, and this temperature may be used for the temperature sensors to cause or simulate a haptic temperature.

In other implementations, systems and methods according to present principles may create a catalog of the haptic feedback systems accessible by the system, termed a "haptic catalog". The systems and methods may then analyze the CG objects susceptible to or likely to provide haptic force on a user. In some cases this environment analysis process may be employed prior to compiling the final virtual or augmented reality application and transferring the same to the computing environment operating the headset (or the headset itself if the same employs an integrated computing environment). Where the environment analysis process is employed prior to compiling the application, information from the environment analysis process (described below) may be sent along with the compiled application for use by the system. In other cases, the environment analysis process may analyze the environment based on the rendered scene or level from the compiled application to determine similar information. In this case, the environment analysis process may employ object recognition techniques to determine information about the objects and their surfaces likely to be the subject of haptic force(s) on a user.

The information from the environment analysis process is used in combination with the haptic catalog to affect the final environment encountered by the user upon running the application. The final environment is a modification of an original environment, where the original environment is the one analyzed by the environment analysis process. The modification of the environment (resulting in the final environment) adjusts the environment such that it is more realistic or consistent or expected by the user in light of the haptic catalog.

As noted above, for example, haptics may be developed which simulate a hard seat (or the user may only have a hard seat available); if the user avatar sits on the seat, they should feel a hard sensation. An exemplary environment in which the user (with an optional associated avatar) may be intended to be situated may be a room that has a soft sofa but no hard seat chairs. In this case, the environment analysis process, also termed an "CG environment and modification process" may detect the soft sofa, either before compilation, e.g., in the game engine, or after compilation, e.g., via object recognition, and convert the soft sofa into a hard bench. In this way, when the user or their avatar sits down, the sensation felt is consistent with what they are expecting, e.g., consistent with the visual indication, i.e., the user sits on a hard bench and that which the user sits on feels hard rather than soft. In this case the user will be sitting on a hard surface in the actual world while the user's avatar sits on a hard surface in the virtual world. Where a bodysuit is employed that can perform sitting (such a bodysuit would require a structure sufficient to support the user while sitting), the end effectors in the bodysuit can either be incompliant, simulating a hard surface, or compliant, simulating a soft surface, in which case either may be rendered visually to the user. Numerous other applications of this system and method will be understood and will fall within the scope of present principles.

General

It is noted that, in this description, most descriptions of objects are pertaining to virtual objects in a virtual world, but the same will be understood according to context.

When end-effectors are being controlled to attain a particular setting, e.g., force, temperature, and so on, various types of control functionality may be employed to move the system to the appropriate state. For example, control feedback systems such as proportional/integral/derivative may be employed, as well as those pertaining to fuzzy logic or model predictive control. It is believed that, particularly temperature settings and others that require finer control, these feedback control mechanisms may be useful to attain the proper state in the shortest period of time. In some cases, such as force being applied to the body, the requirements are more coarse, and the feedback control can likewise be coarser, e.g., perhaps only using proportional/integral components.

In some implementations, as shown, e.g., in FIG. 15, multiple sensors and end effectors may be employed in one or more layers. The sensors may sense the current state of the skin and/or end effector, and the end effectors may be modified to cause a particular action. As noted above, appropriate feedback may be provided from the sensor to the controller of the end effector so as to allow the end effector to reach a particular state, a desired state, in a short period of time, i.e., a period of time that would seem natural to the wearer of the haptic device if the effect was happening in real life rather than virtually. However, different types of sensors, and even sensors of the same type but different models, may have different operating ranges in terms of feedback and characteristic time of operation. For example, a sweat sensor may have a preferred operating range of temperature, as may a temperature sensor. In the same way, a heat contact point may have a preferred operating range of temperature, as may a vibratory motor. Unfortunately, these are generally not all the same. So in some cases, a virtual setting may cause a haptic system to desire to move a first end effector to a desired state, e.g., a desired temperature, a desired vibration state, and so on. However, moving the first end effector to that desired state may cause a second end effector, or a second sensor, to move out of its preferred operating range. Accordingly, it may be desired to not move the first end effector all the way to the desired state, but move it close enough such that the second end effector, or the second sensor, is pushed to the edge of its preferred operating range, but not out of its preferred operating range. For example, it may be desired to move a heat contact point to 105° F. By doing so, a vibratory motor adjacent to the heat contact point may similarly move to 105°, or close thereto. In this scenario the preferred operating range of the vibratory motor is 70° F. to 103° F. Thus, in this case, the ultimate state or target state of the heat contact point may be modified from 105° F. to 103° F., so as to not push the second end effector, i.e., the vibratory motor in this case, out of its preferred operating range. It will be understood that any of the end effectors V, P, A, H, or C, or others not described or shown, may be subject to these limitations and may benefit from analogous steps or other compensations. In particular, a desire to move the state of any of the end effectors V, P, A, H, or C, or others not described or shown to a target T may be modified to a new target T' based on an attempt to keep within the operating range of any of the other end effectors V, P, A, H, or C, or others not described or shown, to a desired range, and the same is true for any of the sensors that similarly provide feedback to the system regarding the status of the user or the status of any of the end effectors V, P, A, H, or C, or others not described or shown.

The system and method may be fully implemented in any number of computing devices. Typically, instructions are laid out on computer readable media, generally non-transitory, and these instructions are sufficient to allow a processor in the computing device to implement the method of the invention. In more detail, the server 131 may be employed to operate the steps described within this specification and claims with appropriate programming as embodied by instructions stored on a non-transitory computer readable medium and which are used to operate a programmer in a computing environment. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that may be seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where actors or performers within a maze are contemplated, the plural inputs may allow plural users (either plural actors or plural patrons or both) to input relevant data at the same time.

While the invention herein disclosed is capable of obtaining the objects hereinbefore stated, it is to be understood that this disclosure is merely illustrative of the presently preferred embodiments of the invention and that no limitations are intended other than as described in the appended claims. For example, the invention can be used in a wide variety of settings, e.g., in the applications of theater, haunted attractions, themed attractions, mazes, and so on.

The invention claimed is:

1. A method of providing haptics effects for users experiencing a virtual environment, comprising:
   monitoring data about a character and an associated environment within a virtual environment;
   from the monitoring data, determining if a haptic effect should be delivered to a user based on an event within the associated environment, the event associated with the character, the user controlling at least one aspect of the character in the virtual environment; and
   if the determining is that a haptic effect should be delivered to the user, then causing the haptic effect to be delivered to the user by transmitting one or more signals to a set of end effectors associated with the haptic effect, the set being associated with a grouping of end effectors, the set of end effectors affecting one or more senses of the user,
   wherein the grouping of end effectors has a first local density at a first haptic location, and the grouping of end effectors has a second local density at a second haptic location, wherein the first local density is different from the second local density, and wherein the first haptic location is configured to affect skin of the user at a first user skin location, and the second haptic location is configured to affect skin of the user at a second user skin location, and wherein mechanoreceptors within the user's skin associated with the haptic effect have a different density at the first user skin location than at the second user skin location,
   wherein at least two different haptic effects are enabled, a first haptic effect including a thermal effect of heating and being caused by a grouping of heating end effectors, and a second haptic effect including a thermal effect of cooling and being caused by a grouping of cooling end effectors, and wherein at a particular location the density of cooling end effectors is two to five times the density of heating end effectors.

2. The method of claim 1, wherein the monitoring data includes monitoring data from a game engine.

3. The method of claim 1, wherein the heating end effectors cause capsaicin to contact skin of the user at a skin location associated with the heating end effectors.

4. The method of claim 1, wherein the haptic effect is a pain effect, and wherein the set of end effectors include alternating heating and cooling end effectors, and wherein the pain effect is caused at skin of a user by simultaneously actuating the alternating heating and cooling end effectors.

5. A system for providing haptics effects for users experiencing a virtual environment, comprising:
   a body-wearable suit configured to cover a portion of a user's body;
   a first grouping of one or more end effectors of a first type, the end effectors of the first type configured to deliver a haptic effect of a first type, the first grouping distributed in a predetermined pattern on the body wearable suit; and
   a second grouping of one or more end effectors of a second type, the end effectors of the second type configured to deliver a haptic effect of a second type, the second grouping distributed in a predetermined pattern on the body wearable suit,
   wherein at a particular location on the body-wearable suit, an areal density of the end effectors of the first type is different from an areal density of the end effectors of the second type,
   wherein multiple haptic effects are enabled, a first haptic effect including a thermal effect of heating and being caused by a grouping of heating end effectors, a second haptic effect including a thermal effect of cooling and being caused by a grouping of cooling end effectors, and wherein at a particular location the density of cooling end effectors is two to five times the density of heating end effectors.

6. The system of claim 5, wherein the body-wearable suit is configured to fit a user's hand or leg or entire body.

7. The system of claim 5, wherein the predetermined pattern of the first grouping is based on an expected distribution of mechanoreceptors associated with the haptic effect of the first type, and wherein the predetermined pattern of the second grouping is based on an expected distribution of mechanoreceptors associated with the haptic effect of the second type.

8. The system of claim 5, wherein the body-wearable suit is configured to be in signal communication with a processor, the processor configured to monitor data about a character and an associated environment within a virtual environment, and from the monitored data, the processor is configured to determine if a haptic effect should be delivered to a user based on an event within the associated environment, the event associated with the character, the user controlling at least one aspect of the character in the virtual environment, and wherein if the determination is to deliver the haptic effect, the processor is configured to provide one or more signals to a first set of end effectors of the first type, or to provide one or more signals to a second set of end effectors of the second type, or both, the signals causing the haptic effect to be delivered to the user.

9. The system of claim 8, wherein the monitored data is from a game engine.

10. The system of claim 5, wherein the heating end effectors are configured to cause capsaicin to contact skin of the user at a skin location associated with the grouping of heating end effectors.

11. The system of claim 5, wherein the haptic effect is a pain effect, and wherein the grouping of end effectors include alternating heating and cooling end effectors, and wherein the pain effect is caused at skin of a user by simultaneously actuating the alternating heating and cooling end effectors.

12. A method of providing haptics effects for users experiencing a virtual environment, comprising:
   monitoring data about a character within a virtual environment;
   from the monitoring data, determining if a haptic effect should be delivered to a user based on an event within the virtual environment, the event associated with the character, the user controlling at least one aspect of the character in the virtual environment, the haptic effect associated with a first visual feature within the virtual environment;
   if the determining is that a haptic effect should be delivered to the user, then determining if the haptic effect is available, and if the haptic effect is available, then causing the haptic effect to be delivered to the user by transmitting one or more signals to a set of end effectors associated with the haptic effect, the set being a subset of a grouping of end effectors, the set of end effectors affecting one or more senses of the user; and
   if the determining is that a haptic effect should be delivered to the user but the determining is that the haptic effect is unavailable, then determining if a substitute haptic effect is available, and if the substitute haptic effect is available, then causing the substitute haptic effect to be delivered to the user by transmitting one or more signals to a set of end effectors associated with the substitute haptic effect, the set being a subset of a grouping of end effectors, the set of end effectors affecting one or more senses of the user, and further modifying the virtual environment to indicate a substitute visual feature associated with the substitute haptic effect in place of the first visual feature within the virtual environment.

13. The method of claim 12, wherein the monitoring data includes monitoring data from a game engine.

14. The method of claim 12, wherein the haptic effect is selected from the group consisting of: a mechanical effect, an air effect, a chemical effect, or a thermal effect, or combinations thereof.

15. The method of claim 14, wherein the haptic effect is a thermal effect, and wherein one or more of the set of end effectors causes capsaicin to contact skin of the user at a skin location associated with the set of end effectors.

16. The method of claim 14, wherein the haptic effect is a pain effect, and wherein the set of end effectors include alternating heating and cooling elements, and wherein the pain effect is caused at skin of a user by simultaneously actuating the alternating heating and cooling elements.

17. The method of claim 12, wherein the event is a user's character touching a soft surface within the associated environment, the determining that the haptic effect is unavailable includes determining that a haptic effect of touching a soft surface is unavailable, the substitute haptic effect is the haptic effect of touching a hard surface, and modifying or the virtual environment to indicate a substitute visual feature includes visually rendering a hard surface in place of the first visual feature of the soft surface.

\* \* \* \* \*